(12) United States Patent
Tang et al.

(10) Patent No.: US 11,012,139 B2
(45) Date of Patent: *May 18, 2021

(54) ADAPTIVE MULTIPLEXING AND TRANSMIT/RECEIVE DIVERSITY

(71) Applicant: Apple Inc., Cupertino, CA (US)

(72) Inventors: Jia Tang, San Jose, CA (US); Zhu Ji, San Jose, CA (US); Yang Li, Plano, TX (US); Johnson O. Sebeni, Fremont, CA (US); Yu-Lin Wang, Fremont, CA (US); Sulabh Khandelwal, San Jose, CA (US); Beibei Wang, Cupertino, CA (US); Zheng Zhang, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/587,242

(22) Filed: Sep. 30, 2019

(65) Prior Publication Data

US 2020/0044726 A1 Feb. 6, 2020

Related U.S. Application Data

(63) Continuation of application No. 15/994,708, filed on May 31, 2018, now Pat. No. 10,432,292.

(60) Provisional application No. 62/597,290, filed on Dec. 11, 2017.

(51) Int. Cl.
*H04B 7/08* (2006.01)
*H04L 5/00* (2006.01)
*H04W 76/28* (2018.01)
*H04B 17/318* (2015.01)
*H04B 17/382* (2015.01)
*H04W 52/24* (2009.01)

(52) U.S. Cl.
CPC ......... *H04B 7/0825* (2013.01); *H04B 17/318* (2015.01); *H04B 17/382* (2015.01); *H04L 5/0057* (2013.01); *H04W 76/28* (2018.02); *H04W 52/24* (2013.01)

(58) Field of Classification Search
CPC .. H04B 7/0825; H04B 17/318; H04B 17/382; H04B 7/0608; H04L 5/0057; H04W 76/28; H04W 52/24
See application file for complete search history.

(56) References Cited

U.S. PATENT DOCUMENTS

| | | |
|---|---|---|
| 8,755,476 B2 | 6/2014 | Li |
| 8,761,701 B2 | 6/2014 | Ramasamy |
| 9,496,937 B1 | 11/2016 | Wang |
| 9,578,520 B2 | 2/2017 | Bhattad |
| 10,231,280 B2 | 3/2019 | Lee |

(Continued)

FOREIGN PATENT DOCUMENTS

| | | |
|---|---|---|
| CN | 1886996 | 12/2006 |
| CN | 105306119 | 2/2016 |

*Primary Examiner* — Kenneth T Lam
(74) *Attorney, Agent, or Firm* — Kowert, Hood, Munyon, Rankin & Goetzel, P.C.

(57) ABSTRACT

Adaptive multiplexing and transmit/receive diversity. A wireless device may include multiple antennas. A first set of antennas may be used for communication. One or more trigger conditions may be determined, and additional antennas may be activated for measurement. Based on the measurement(s), a second set of antennas may be selected and used for communication.

20 Claims, 23 Drawing Sheets

(56) References Cited

U.S. PATENT DOCUMENTS

| | | | |
|---|---|---|---|
| 10,432,292 B2* | 10/2019 | Tang | H04B 17/318 |
| 2006/0258304 A1 | 11/2006 | Moon | |
| 2008/0151871 A1 | 6/2008 | Parts | |
| 2011/0249760 A1 | 10/2011 | Chrisikos | |
| 2011/0312353 A1 | 12/2011 | Banister | |
| 2012/0115553 A1* | 5/2012 | Mahe | H04W 52/0245 |
| | | | 455/575.7 |
| 2014/0162574 A1* | 6/2014 | Rousu | H04W 52/42 |
| | | | 455/78 |
| 2015/0249531 A1 | 9/2015 | Lindoff | |
| 2016/0036508 A1* | 2/2016 | Szini | H04B 7/0814 |
| | | | 375/227 |
| 2016/0127972 A1* | 5/2016 | Ananthanarayanan | |
| | | | H04W 76/30 |
| | | | 370/332 |
| 2016/0226709 A1* | 8/2016 | Chen | H04L 1/0007 |
| 2016/0248496 A1* | 8/2016 | Bellamkonda | H04B 7/0632 |
| 2016/0286603 A1 | 9/2016 | Vajapeyam | |
| 2016/0302150 A1 | 10/2016 | Palenius | |
| 2016/0352408 A1 | 12/2016 | Greene | |
| 2017/0085310 A1 | 3/2017 | Yu | |
| 2017/0126288 A1 | 5/2017 | Sandhu | |
| 2017/0245317 A1 | 8/2017 | Lee | |
| 2018/0062242 A1* | 3/2018 | Szini | H01Q 5/392 |
| 2019/0007121 A1* | 1/2019 | Zhinong | H04B 17/29 |
| 2019/0021052 A1 | 1/2019 | Kadiri | |
| 2019/0028980 A1 | 1/2019 | Feuersaenger | |

* cited by examiner

| Measurement Interval | alpha | T | Threshold (TH) | |
|---|---|---|---|---|
| | | | DCH | RACH |
| 10ms | 1/128 | 800ms | D + 3dB | D |
| 20ms | 1/64 | 800ms | D + 3dB | D |
| 40ms | 1/32 | 800ms | D + 3dB | D |
| 80ms | 1/16 | 1600ms | D + 3dB | D |
| 160ms | 1/8 | 1600ms | D + 3dB | D |
| 240ms | 1/4 | 1600ms | D + 3dB | D |
| 480ms | 1/2 | 1600ms | D + 3dB | D |
| 960ms | 3/4 | 3200ms | D + 4dB | D |
| 1280ms | 3/4 | 3200ms | D + 4dB | D |
| 1920ms | 1 | 3200ms | D + 5dB | D |
| >1920ms | 1 | 6400ms | D + 6dB | D |

*FIG. 8C*

$$D_i = \Delta TIS_i + \Delta TRP_i$$
$$\Delta TIS_i = TIS_0 - TIS_i$$
$$\Delta TRP_i = TRP_0 - TRP_i$$

*FIG. 8D*

| Case # | Description |
|---|---|
| a | DRxD |
| b | Grant detected (rank 2) |
| c | 1. 4-ports measurement<br>2. RLM indicates out-of-sync<br>3. 4x4 TPR (rank 2) better than 4x2 TPR |
| d | 1. 4-ports measurement complete<br>2. 4x4 TPR (rank 2) better than 4x2 TPR |
| e | 1. Channel rank improves to 4<br>2. Grant detected (rank 4) |
| f | 1. Channel rank degrades to 2<br>2. 4x4 TPR (rank 4) worse than 4x4 (rank 2) |
| g | DRxD |

| Case # | Max MIMO Layer # | Max Rx # | Possible MIMO Configuration | Description |
|---|---|---|---|---|
| 1 | 2 | 2 | 2x1 or 4x1 | DRxD |
| 2 | | | 2x2 or 4x2 | Default mode for 2 layer MIMO |
| 3 | | 2 | 2x1 or 4x1 | DRxD (due to inactivity). |
| 4 | 4 | | 2x2 or 4x2 | Default mode for 2 layer MIMO. |
| 5 | | | 2x4 or 4x4 | FE-DRxD (enable high order RxD due to channel cond.). |
| 6 | | | 4x1 | DRxD (due to inactivity). |
| 7 | | 4 | 4x2 | FE-DRxD (due to channel condition). |
| 8 | | | 4x4 | Default mode for 4 layer MIMO. Peak throughput mode. |

FIG. 10

$$TPR_{rank2}^{4Rx} = \frac{\gamma}{P_{4Rx}} \Sigma_{4Rx} MI_{rank2}$$

$$TPR_{rank2}^{2Rx} = \frac{\gamma}{P_{2Rx}} \Sigma_{best\ 2Rx} MI_{rank2}$$

$$TPR_{rank4}^{4Rx} = \frac{\gamma}{P_{4Rx}} \Sigma_{4Rx} MI_{rank4}$$

FIG. 12A $$TPR_{rank2}^{4Rx} = \frac{2\gamma}{P_{4Rx}} \log_2\left(1 + \frac{1}{2}\Sigma_{4Rx} SNR_i\right)$$

$$TPR_{rank2}^{2Rx} = \frac{2\gamma}{P_{2Rx}} \log_2\left(1 + \frac{1}{2}\Sigma_{best\ 2Rx} SNR_i\right)$$

$$TPR_{rank4}^{4Rx} = \frac{4\gamma}{P_{4Rx}} \log_2\left(1 + \frac{1}{4}\Sigma_{4Rx} SNR_i\right)$$

FIG. 12B $$y = KHx + n$$

$$H = \begin{bmatrix} 1 & 0 \\ 0 & \alpha \end{bmatrix}$$

$$KK^* = \begin{bmatrix} 1 & \beta \\ \beta^* & 1 \end{bmatrix}$$

$$C_{TM4}(\alpha,\beta) = \sum_i \log_2\left(1 + \frac{\lambda_i^2}{N_0}\right)$$

FIG. 15A $$\tilde{H} = KH$$

FIG. 15B $$y = \tilde{H}x + n$$

FIG. 15C $$C_{TM3}(\alpha,\beta) = \log_2\left(det\left(I + \frac{\tilde{H}\tilde{H}^*}{N_0}\right)\right)$$

FIG. 15D $$TPR_{TM3} = \frac{\gamma}{P} C_{TM3}(\alpha,\beta)$$
$$TPR_{TM4} = \frac{\gamma}{P} C_{TM4}(\alpha,\beta)$$

FIG. 15E

ADAPTIVE MULTIPLEXING AND TRANSMIT/RECEIVE DIVERSITY

PRIORITY CLAIM

This application is a continuation of and claims priority to U.S. patent application Ser. No. 15/994,708, entitled "Adaptive Multiplexing and Transmit/Receive Diversity," filed May 31, 2018, which claims priority to U.S. provisional patent application Ser. No. 62/597,290, entitled "Adaptive Multiplexing and Transmit/Receive Diversity," filed Dec. 11, 2017, each of which is hereby incorporated by reference in its entirety as though fully and completely set forth herein.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

FIELD

The present application relates to wireless communication, and more particularly to a system, apparatus, and method for performing antenna selection in a wireless device.

DESCRIPTION OF THE RELATED ART

Wireless communication systems are rapidly growing in usage. Further, wireless communication technology has evolved from voice-only communications to also include the transmission of data, such as Internet and multimedia content. There exist numerous different wireless communication technologies and standards. Some examples of wireless communication standards include GSM, UMTS (WCDMA), LTE, LTE Advanced (LTE-A), 3GPP2 CDMA2000 (e.g., 1xRTT, 1xEV-DO, HRPD, eHRPD), IEEE 802.11 (WLAN or Wi-Fi), IEEE 802.16 (WiMAX), Bluetooth, and others.

With the increasing number of wireless communication technologies in existence, it has become more common for wireless devices to include multiple antennas and/or multiple radios to implement various wireless communication technologies. Improvements in the field of adaptively selecting a set of antennas for transmitting and/or receiving data are desired.

SUMMARY

Embodiments are presented herein of, inter alia, a method for a wireless communication device, such as a user equipment (UE) device, to adaptively select antennas used for wireless communication, and of devices and apparatuses configured to implement the method.

According to the techniques described herein, the antenna or antennas to be used for reception, transmission, or both transmission and reception by a UE may be selected at least partially based on various current conditions. This concept may be referred to as adaptive receive/transmit diversity (ARTD).

A UE communicating with a first set of antennas may determine that one or more trigger conditions are met. The UE may activate additional antennas or all antennas to measure conditions. Based on the conditions, the UE may select a second set of antennas and may operate with the second set.

Note that the techniques described herein may be implemented in and/or used with a number of different types of devices, including but not limited to, cellular phones, portable media players, tablet computers, wearable devices, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description is considered in conjunction with the following drawings.

FIG. 8C is a table illustrating exemplary parameter values, according to some embodiments;

FIG. 8D illustrates equations for calculating parameter values, according to some embodiments;

FIGS. 9A-C and 10 illustrate finite state machine (FSM) diagrams and MIMO modes, according to some embodiments;

FIGS. 12A-B, 13A-D, 14A-C, 15A-E, and 16A-D illustrate throughput/power ratio (TPR) calculations, according to some embodiments.

Figure 1:
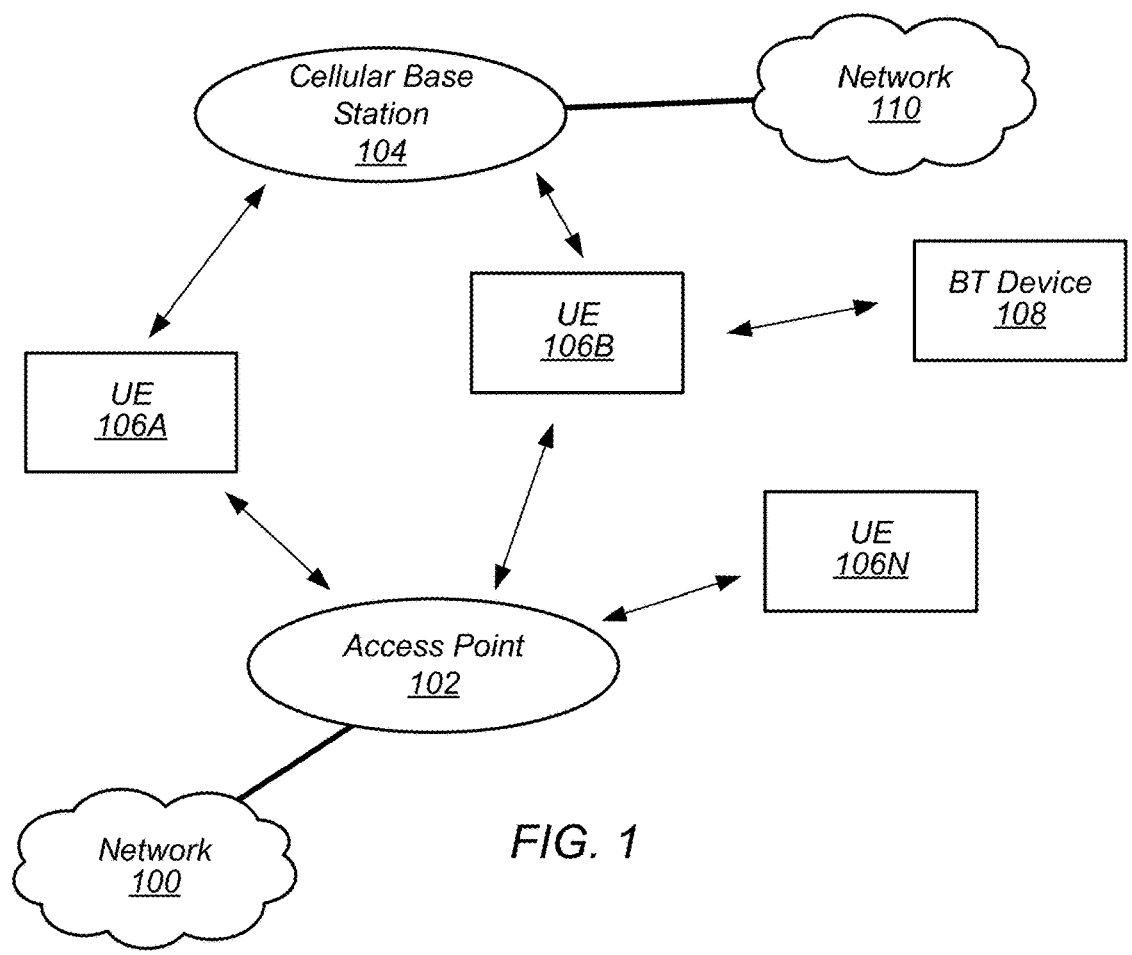
FIG. 1 illustrates an exemplary wireless communication system.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

The following are definitions of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer system devices which performs wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" (also called "eNB") has the full breadth of its ordinary meaning, and at least includes a wireless communication station installed at a fixed location and used to communicate as part of a wireless cellular communication system.

Link Budget Limited—includes the full breadth of its ordinary meaning, and at least includes a characteristic of a wireless device (e.g., a UE) which exhibits limited communication capabilities, or limited power, relative to a device that is not link budget limited, or relative to devices for which a radio access technology (RAT) standard has been developed. A wireless device that is link budget limited may experience relatively limited reception and/or transmission capabilities, which may be due to one or more factors such as device design, device size, battery size, antenna size or design, transmit power, receive power, current transmission medium conditions, and/or other factors. Such devices may be referred to herein as "link budget limited" (or "link budget constrained") devices. A device may be inherently link budget limited due to its size, battery power, and/or transmit/receive power. For example, a smart watch that is communicating over LTE or LTE-A with a base station may be inherently link budget limited due to its reduced transmit/receive power and/or reduced antenna. Wearable devices, such as smart watches, are generally link budget limited devices. Alternatively, a device may not be inherently link budget limited, e.g., may have sufficient size, battery power, and/or transmit/receive power for normal communications over LTE or LTE-A, but may be temporarily link budget limited due to current communication conditions, e.g., a smart phone being at the edge of a cell, etc. It is noted that the term "link budget limited" includes or encompasses power limitations, and thus a power limited device may be considered a link budget limited device.

Processing Element (or Processor)—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

IEEE 802.11—refers to technology based on IEEE 802.11 wireless standards such as 802.11a, 802.11b, 802.11g, 802.11n, 802.11-2012, 802.11ac, and/or other IEEE 802.11 standards. IEEE 802.11 technology may also be referred to as "Wi-Fi" or "wireless local area network (WLAN)" technology.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
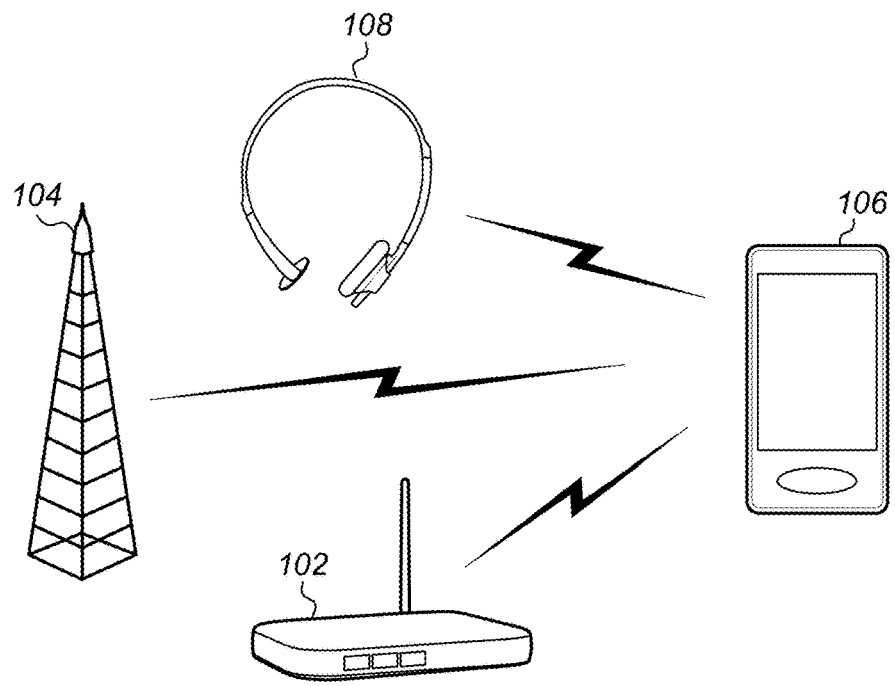
FIG. 2 illustrates a wireless device performing wireless communication according to multiple wireless communication technologies.

FIGS. 1 and 2—Exemplary Communication System

FIGS. 1 and 2 illustrate an exemplary (and simplified) wireless communication system. It is noted that the system of FIG. 1 is merely one example of a possible system, and embodiments may be implemented in any of various systems, as desired.

As shown, the exemplary wireless communication system includes an access point 102 which communicates over a transmission medium with one or more user devices 106A, 106B, etc., through 106N. Each of the user devices may be referred to herein as a "user equipment" (UE). Thus, the user devices are referred to as UEs or UE devices.

The access point 102 may be an access point providing a wireless local area network (WLAN). The access point 102 may be equipped to communicate with a network 100 (e.g., a wide area network (WAN), such as the Internet, among various possibilities). Thus, the access point 102 may facilitate communication between the UEs 106 and/or between the UEs 106 and the network 100. The access point 102 and the UEs 106 may be configured to communicate over the transmission medium using Wi-Fi, including any of various versions of IEEE 802.11 (e.g., a, b, g, n, ac, etc.).

One or more of the UEs 106 (e.g., UEs 106A, 106B) may also or alternatively be configured to communicate with a base station 104. The base station 104 may be a base transceiver station (BTS) or cell site (a "cellular base station"), and may include hardware that enables wireless communication with UEs 106 according to one or more cellular communication protocols. Such a UE 106 and the cellular base station 104 may communicate using any of various cellular communication technologies such as GSM, UMTS (WCDMA, TDS-CDMA), LTE, LTE-Advanced (LTE-A), 3GPP2 CDMA2000 (e.g., 1xRTT, 1xEV-DO, HRPD, eHRPD), 5G/NR, etc.

As shown, the cellular base station may be equipped to communicate with a network 110 (e.g., a core network of a cellular service provider, a telecommunication network such as a public switched telephone network (PSTN), and/or the Internet, among various possibilities). Thus, the base station 104 may facilitate communication between UEs 106 and/or between the UEs 106 and the network 110. The cellular base station 104 may provide UEs 106 with various telecommunication capabilities, such as voice, SMS, and/or data services.

One or more of the UEs 106 (e.g., UE 106B) may also or alternatively be configured to communicate with a Bluetooth device 108 via a Bluetooth link. The Bluetooth device 108 may be any of a variety of types of Bluetooth devices, including a headset, a car speaker system, mouse, keyboard, or other input device, another wireless device, etc.

Thus, at least in some instances a UE 106 may be capable of communicating using multiple wireless communication technologies, such as exemplified by UEs 106A and 106B illustrated in FIG. 1. In addition, or as alternatives to Wi-Fi, Bluetooth, and various cellular communication standards, a UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication technology, as desired. Note additionally that it may also be possible for a UE to only be capable of communicating using a single wireless communication technology, if desired.

FIG. 2 illustrates a UE device 106 (e.g., UE device 106B illustrated in FIG. 1) in communication with a Wi-Fi access point 102, cellular base station 104, and Bluetooth device 108. Thus, the UE 106 may be configured to communicate using any of multiple wireless communication protocols. The UE 106 may be any of various possible devices with wireless communication capability, such as a mobile phone, a hand-held device, a computer or a tablet, or virtually any type of wireless device.

The UE 106 may include a processor that is configured to execute program instructions stored in memory. The UE 106 may perform any of the methods embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include multiple antennas for communicating using one or more wireless communication protocols or technologies. In one embodiment, the UE 106 might be configured to communicate using either of multiple wireless communication technologies using a single shared radio. The shared radio may couple to a single antenna, or may couple to multiple antennas (e.g., for multiple-in-multiple-out (MIMO)) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies.

In some embodiments, the UE 106 may include separate transmit and/or receive chains for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 1xRTT (or LTE or GSM or 5G NR), and separate radios for communicating using each of Wi-Fi and Bluetooth. Other configurations are also possible.

In some instances, couplings between some or all antennas and radios of a UE 106 may be dynamically configurable. For example, antenna switching logic may be provided in a UE 106 to dynamically determine and configure (or reconfigure) which antenna(s) of the UE will be used for wireless communication by which radio(s). One or more antennas and radios of a UE 106 may alternatively or additionally be permanently (fixedly) coupled to each other, if desired.

The BS 104 may be configured to communicate according to MIMO techniques. For example, the BS 104 may use multiple antennas to communicate with UE 106 using one or more transmit chains and/or receiver chains. Technical standards may describe a variety of modes for communication between these devices, e.g., LTE or 5G NR standards may describe various transmission modes (TM) which may specify different transmission schemes for physical downlink shared channel (PDSCH) messages. For example, TM1 may utilize only a single antenna, while other (e.g., higher numbered) modes may utilize additional antennas. One or more physical downlink control channel (PDCCH) messages may include control information. The control info may include an allocated rank (e.g., rank identifier or RI) and modulation and coding scheme (MCS). The nature of the control information may differ between different transmission modes. For example, according to TM3 and TM4, a pre-coding matrix indicator (PMI), may be included, but according to TM9, PMI may not be included.

Figure 3:
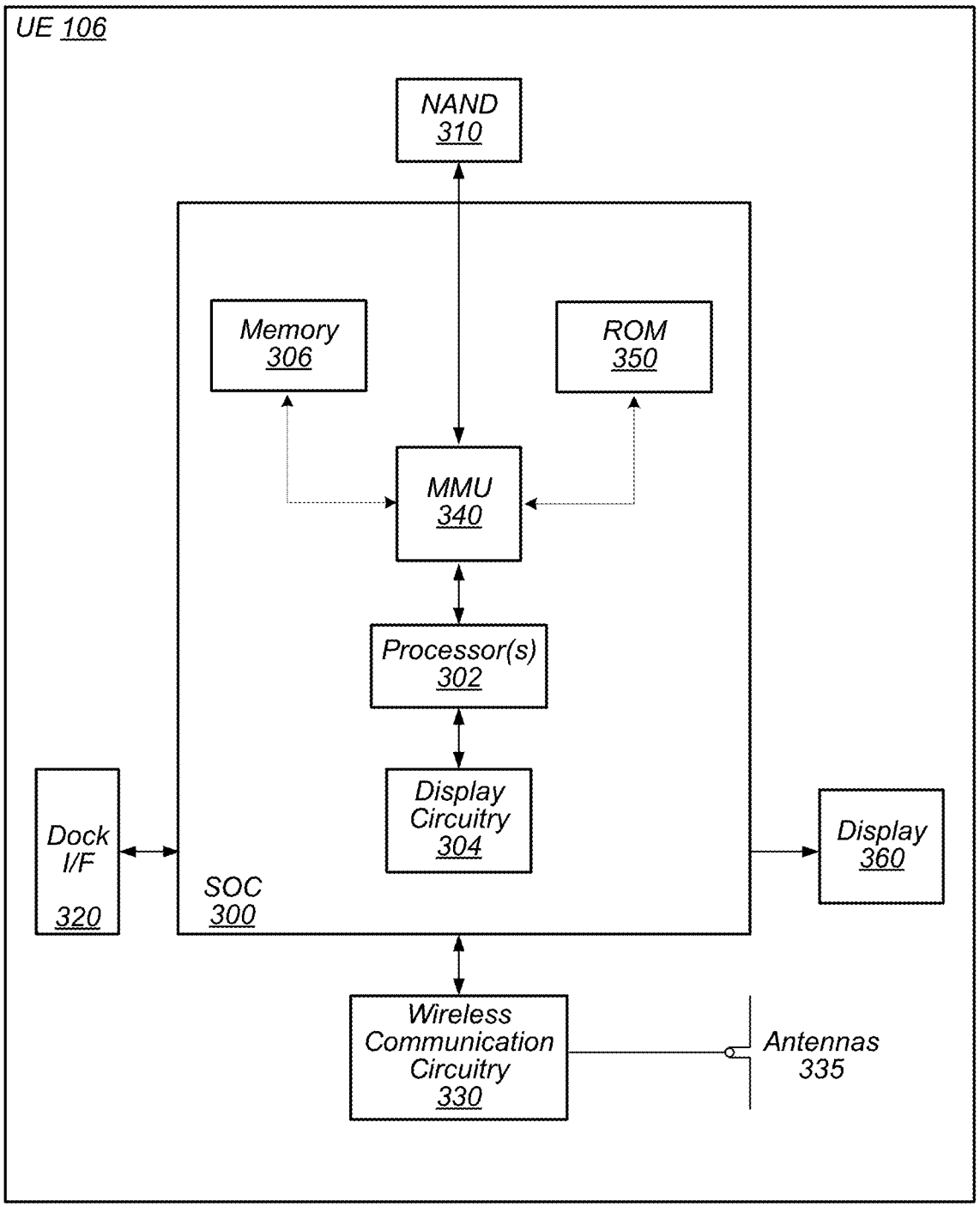
FIG. 3 is a block diagram illustrating an exemplary wireless device.

FIG. 3—Exemplary Block Diagram of a Wireless Device

FIG. 3 illustrates an exemplary block diagram of a UE 106. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, wireless communication circuitry 330 (e.g., including one or more radios), connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, 5G NR, CDMA2000, Bluetooth, Wi-Fi, GPS, etc.).

As noted above, the UE 106 may be configured to communicate wirelessly using multiple wireless communication technologies. As further noted above, in such instances, the wireless communication circuitry (radio(s)) 330 may include radio components which are shared between multiple wireless communication standards and/or radio components which are configured exclusively for use according to a single wireless communication standard. As shown, the UE device 106 may include multiple antennas 335 (e.g., for implementing different wireless communication technologies, for MIMO, for flexibility, etc., among various possibilities) for performing wireless communication with base stations, access points, and/or other devices.

The UE 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone, speakers, one or more cameras, one or more buttons, and/or any of various other elements capable of providing information to a user and/or receiving/interpreting user input.

The UE 106 may include hardware and software components for implementing the features described herein. The processor 302 of the UE device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the UE device 106, in conjunction with one or more of the other components 300, 304, 306, 310, 320, 330, 335, 340, 350, 360 may be configured to implement part or all of the features described herein.

Figure 4:
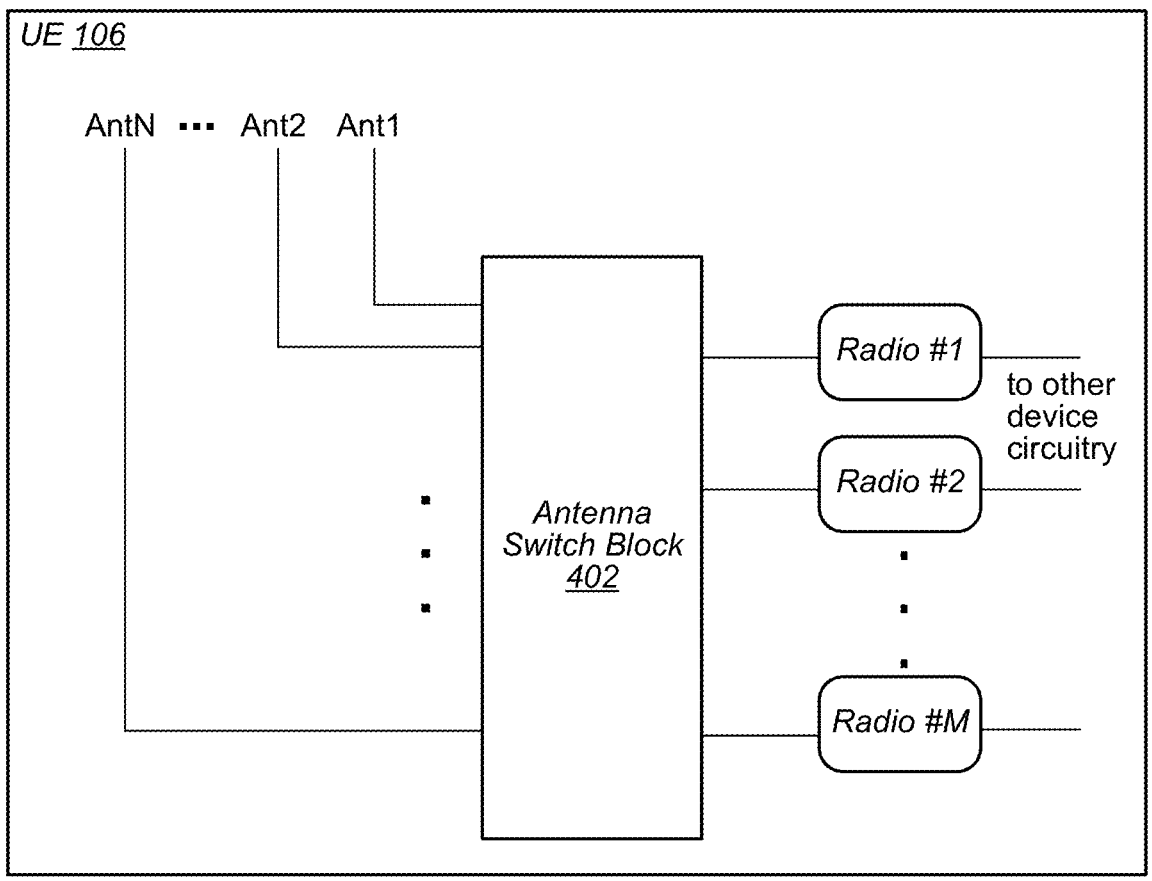
FIG. 4 is a block diagram illustrating an exemplary RF portion of a wireless device.

FIG. 4—Exemplary Block Diagram of an RF portion of a Wireless Device

FIG. 4 is a block diagram illustrating an exemplary RF portion of a wireless device (such as one of the UEs 106 illustrated in FIGS. 1-3) with a configurable antenna arrangement. It should be noted that the exemplary details illustrated in and described with respect to FIG. 4 are not intended to be limiting to the disclosure as a whole: numerous variations and alternatives to the details provided herein below with respect to FIG. 4 are possible and should be considered within the scope of the disclosure.

As shown, the UE 106 may include an array of N antennas and an array of M radios. Each antenna and each radio may couple to an antenna switch block 402. The antenna switch block 402 may be capable of switching couplings/connections between antennas of the antenna array and radios of the radio array to provide connectivity between various radio/antenna combinations.

Any of various algorithms may be used to determine how the antenna switch block 402 switches connectivity between the various possible radio/antenna combinations. As one possibility, a technique which utilizes various conditions may be used. Such conditions may include use of one or more timers and measurements using one or more of the antennas (for example according to any of the features described further subsequently herein) may be used. For convenience, the singular term "radio" may be used to describe all radios of the device configured to operate according to a relevant communication standard. For example, if a UE 106 has a plurality of radios configured to operate according to LTE, the plurality of radios may collectively be referred to as a radio.

Figure 5:
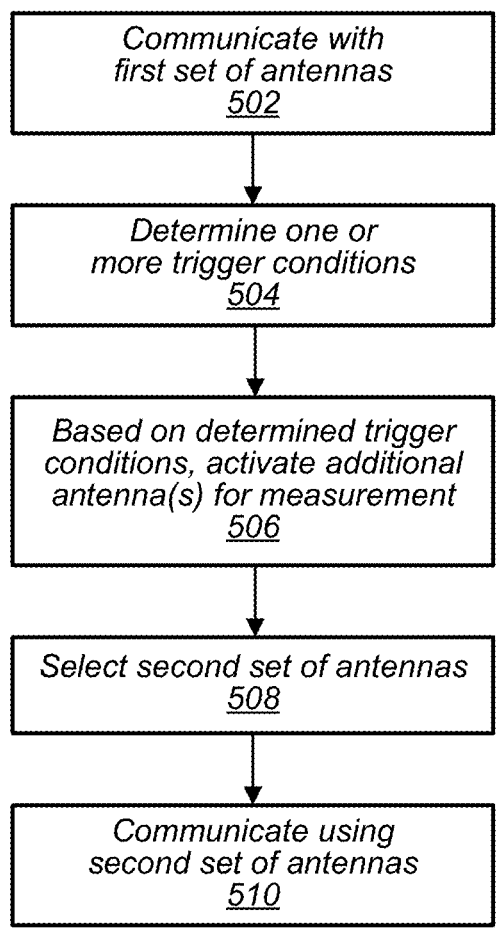
FIG. 5 is a flowchart diagram illustrating methods for a wireless device to adaptively select antennas, according to some embodiments.

FIG. 5—Adaptive Multiplexing and Transmit/Receive Diversity

As previously noted herein, many wireless devices may be configured to communicate according to multiple wireless communication technologies. In many cases, this may include providing multiple antennas in the wireless device. The different antennas may have different characteristics, e.g., based on size, position, and/or orientation in the wireless device. Different antennas (and possibly associated transmission lines, etc.) may be designed for different applications, and so for example might have different resonant frequencies, directionality, shielding, balance/imbalance, and/or other differing characteristics. It may thus sometimes be the case that, based on radio and antenna characteristics (and possibly also depending on a particular communication scenario), and under equal wireless communication medium conditions, one or more antennas of a wireless device may be better suited for use in conjunction with a particular radio of the wireless device than other antennas of the wireless device. Similarly, it may be the case that changes in wireless communication conditions may cause changes in the set of antennas that may offer best communication characteristics.

However, in practice, variations in wireless communication medium conditions (e.g., RF conditions) at each antenna may also have a significant impact on which antenna(s) perform best in conjunction with a particular radio at any given time. For example, different antennas of a wireless device may experience different signal strength as well as different noise and interference conditions at different times. For example, two different antennas of a wireless device might have different levels of interference and/or signal attenuation, among various possible differences, for example based on conditions in the environment of the device. For example, based on the position of nearby objects (e.g., a user's hand) one antenna may have a relatively clear path to/from a base station while another antenna may have a relatively obstructed path. Such differences in the environment of the device may result in different performance characteristics of the various antennas. These performance characteristics may be assessed through measurements, e.g., of signal strength and/or interference. Accordingly, a device may achieve performance benefits by adaptively selecting a set of antennas based on such conditions.

In some embodiments, performance benefits may be achieved by using more (e.g., or all) antennas. For example, a device with four antennas may use three antennas for reception and a fourth antenna for transmission and possibly reception as well. This approach may offer a high level of performance or throughput, but may require higher power use (e.g., resulting in less battery life) than using fewer antennas. Further, in some circumstances, a base station, access point, or other network device may configure a wireless device to use certain antennas or a certain number of antennas for communication. For example, a base station may configure a UE to use four antennas for reception of 4×4 MIMO signals (e.g., by indicating rank 4, e.g., rank indicator (RI) equal to 4). However, in some embodiments, a UE may be able to determine a number of antennas to use. For example, if a base station selects 2×2 MIMO signals, a UE device may be able to choose between using a single antenna to receive, using 2 antennas to receive, and using four antennas to receive. Thus, in such cases the UE may be able to make tradeoffs between higher performance or more efficient (e.g., in terms of power usage) operation.

During communication with a first set of antennas, the device may take measurements of any of various received signal metrics including signal to noise ratio (SNR), signal to interference and noise ratio (SINR), received signal code power (RSCP), received signal strength indication (RSSI), reference signal received power (RSRP), reference signal received quality (RSRQ), and channel quality indicator (CQI), among other possibilities. Such measurements may be taken without requiring additional energy and without interrupting communication (e.g., transmission and/or reception) using the first set of antennas. Such radio measurements may characterize performance of the first set of antennas under the current conditions, but may not directly reveal information about the potential performance of additional antennas, e.g., not included in the first set. Accordingly, if performance of the first set of antennas is lower than a desired level of performance, it may be desirable to take one or more of various actions: 1) take measurements using additional antennas, 2) power on additional antennas, and/or 3) switch to a different set of antennas. However, any of these actions may result in additional energy use and/or interruption of reception and/or transmission. For example, some wireless devices may have a hardware limitation such that the set of active antennas cannot be modified without interrupting communication. Thus, techniques to balance the performance benefits of using additional antennas for communication and/or measurement versus the cost (e.g., potentially lost data transmission/reception and energy) may be desired.

Accordingly, at least in some instances, performance improvements may be achieved in a wireless device by providing flexibility in antenna selection, with consideration given to RF conditions experienced at each antenna as well as compatibility/interaction between radio and antenna characteristics in a current communication scenario. FIG. 5 is a flowchart diagram illustrating a method for providing such adaptive multiplexing and transmit/receive diversity capability. More particularly, the method of FIG. 5 may be used to select an antenna (or multiple antennas) for wireless communication use (e.g., transmission, reception, or both) by a wireless device at a particular time.

The method shown in FIG. 5 may be used in conjunction with any of the computer systems or devices shown in the Figures, among other devices. As one particular example, the method may be implemented by a wireless user equipment device, such as a UE 106 illustrated in and described herein with respect to FIGS. 1-4. The UE may include multiple antennas, at least a subset of which may be available for switching between by the radio for which an antenna is being selected according to the method of FIG. 5. The UE may also include multiple radios, though the method may alternatively be implemented in a UE including a single radio if desired. In various embodiments, some of the method elements shown may be performed concurrently, in a different order than shown, or may be omitted. Additional method elements may also be performed as desired. As shown, this method may operate as follows.

In 502, the UE may communicate with a first set of antennas. The first set of antennas may include one, some, or all of the antennas of the device. One or more antennas of the first set may be used to send/transmit signals, and one or more antennas may be used to receive signals. The antenna(s) used for transmission may or may not be the same as (e.g., or overlap with) the antenna(s) used for reception. The device may communicate according to any of various wireless communication standards, such as UMTS (WCDMA), GSM, LTE, 5G NR, etc. While many of the examples given herein are presented in terms of WCDMA and/or LTE, use of these details is illustrative only and is not intended to be limiting to the disclosure. The first set of antennas may include any or all of the antennas that are configured for communication with the wireless communication standard(s) in use.

While communicating with the first set of antennas, the device may monitor radio link conditions (e.g., by taking measurements, continuously, randomly (e.g., as needed), or periodically). The device may monitor such conditions for each antenna of the first set of antennas individually and/or for the first set of antennas together. Any of various received signal metrics including SNR, SINR, RSCP, RSSI, RSRP, RSRQ, and CQI may be monitored.

While communicating with the first set of antennas, the device may enter (e.g., and/or operate in) any of various states. For example, the device may be idle or may be in a connected mode, among other possibilities. The device may use features such as discontinuous reception (DRX). The device may transmit and/or receive data of any type, such as voice, application, or control data.

In 504, the device may determine one or more trigger conditions, which may indicate that it may be beneficial to take measurements and consider selecting a new set of antennas. The trigger conditions may include a throughput/power ratio (TPR), transmission power, a received signal metric, a failure or out of service (e.g., out of sync) event, and/or expiration of various timer(s), among other possibilities.

A throughput/power ratio (TPR) may be calculated by the device based on the current throughput (e.g., including uplink transmissions, downlink reception, or both) and the current power use associated with the active antennas. Such a ratio may be calculated in any applicable manner, including based on an averaging period and/or data lookup tables. A TPR may be a direct indicator of efficiency, e.g., in terms of data communicated relative to energy used. In some embodiments, a current TPR may be compared to a TPR of an alternative set of antennas (e.g., based on a lookup table). If the difference between the TPR of an alternative set of antennas and the current TPR exceeds a threshold, a trigger condition may be determined to exist. Such a condition may indicate that a significant improvement to TPR may possibly be achieved by changing active antennas. Similarly, a current TPR may be compared to a TPR threshold, and a trigger condition may be determined to exist if the current TPR is below the threshold.

Transmission power may also be a trigger condition. In some embodiments, if the transmission power exceeds a transmission power threshold, a trigger condition may be determined to exist. Such a threshold may constitute a maximum transmission power or a percentage of a maximum transmission power (e.g., corresponding to a transmission power headroom relative to a current transmission power). In some embodiments, a base station may signal to the wireless device to increase transmission power based on the strength or quality of the signal received by the base station. Thus, transmission power increases may correspond to increases in the level of obstruction or interference relative to an active transmission antenna.

One or more received signal metrics may also be a trigger condition, e.g., if a received signal metric falls below a received signal threshold, a trigger condition may be determined to be present. For example, if RSCP falls below an RSCP threshold, an explanation may be that the environment has changed to obstruct one or more active reception antennas. Accordingly, selecting different antennas may be desirable to achieve better RSCP. Note that any of various received signal metrics, or any combination thereof, may be used to determine a trigger condition.

Any of various radio link failure events may also constitute a trigger condition. For example, an out of service (OOS) event may be a trigger condition. Similarly, other types of events (e.g., failure events) may also be trigger conditions including: random access channel (RACH) failure (e.g., contention based or non-contention based), S-criteria failure, most recently used search procedures, failure of message 3 (MSG3) transmission, signal bar drop, or scheduling request (SR) failure. Further, in some embodiments, a number of such events over a certain time period (e.g., a failure rate) may be a trigger condition. For example, if a number of SR and/or RACH failures exceeds a threshold (e.g., within a specified length of time), a trigger condition may be determined to exist. Such a failure rate may indicate that the current antenna set is not providing sufficient performance, e.g., particularly for messages transmitted with maximum transmission power and not successfully received by the network.

A trigger condition may be determined based on one or more timers. For example, a timer may expire, and such expiration may trigger a measurement. Such a timer may be a prohibit timer configured to prohibit activation of additional antennas for a certain period of time after a previous measurement. In some embodiments, such a prohibit timer may be started by a device operating in idle mode following a measurement using all antennas. As one specific example, the timer may be set to expire in 10.24 seconds, among other possibilities. In some embodiments, the value of such a timer may be set based on DRX cycles, e.g., to a certain number of DRX cycles. In some embodiments, rather than being dynamically triggered (or in addition to dynamic triggering), a timer may be configured to trigger measurements at a regular interval. For example, a timer may be set to trigger measurements every 25 frames, among other possibilities.

In 506, the wireless device may activate (e.g., power on) additional antenna(s) for measurement. In some embodiments, all antennas associated with the active radio or wireless communication standard may be used. For example, a wireless device with four antennas may first operate with a set of two active antennas: one performing transmit and receive, and the other receiving only. Such a device may enable the remaining two antennas to receive for the measurements. As noted above, some devices may have hardware limitations such that communications (e.g., uplink and/or downlink) are interrupted by such activation of additional antennas.

In some embodiments, no additional antennas may be activated. For example, if all antennas are previously active (e.g., the first set of antennas includes all antennas), no additional antennas may be activated. Under such circumstances, the device may periodically, or continuously, take measurements for some or all antennas. Thus, antennas that are already on may be configured to measure continuously during operation or, generally, more often than the measurements of antennas that are turned off, which may occur less frequently.

The wireless device may take one or more radio link measurements using the active antennas (e.g., the first set of antennas and the additional activated antennas). The wireless device may measure any of various received signal metrics including SNR, SINR, RSCP, RSSI, RSRP, RSRQ, and CQI, among other possibilities. The wireless device may measure any combination of these metrics for any combination of the active antennas.

The wireless device may take these measurements once or may take the measurements multiple times. For example, the wireless device may periodically take measurements for a measurement duration (e.g., two frames, among other possibilities), deactivate the additional antennas for a duration (e.g., of a same or different length than the measurement duration), and then reactivate the additional antennas for additional measurements. Such a pattern may be repeated so that measurements are taken at a regular measurement interval (e.g., configured as a number of slots, frames, DRX cycles, or seconds). In some embodiments, the device may take these measurements continuously for a measurement duration.

The wireless device may aggregate measurements taken over a measurement duration or over multiple measurement durations. For example, the device may use hysteresis, averaging, and/or other techniques (e.g., statistics) to combine measurements.

The wireless device may report the measurements or aggregated measurements to a base station or other device. The base station or other device may or may not perform some or all of the calculations and determinations described herein.

In 508, the wireless device (e.g., or a network device) may select a second set of antennas based at least in part on the one or more measurements. The selection of the second set may occur at any time. In some embodiments, the selection may occur during a combined measurement, evaluation/selection, and swap period such that over the course of the period one or more measurements may be taken, a decision may be reached to identify the second set of antennas, and antennas that are not part of the selected second set of antennas may be deactivated. For example, such a combined measurement, selection and swap may occur over the course of four frames. In some embodiments, the selection may occur following a measurement. For example, additional antennas may be deactivated following a measurement.

Selecting the second set of antennas may comprise any of a variety of types of changes. For example, the same antennas may be selected, but a different antenna (or subset of antennas) may be selected for transmission. In some embodiments, the number of selected antennas may change, e.g., the second set may include more or less antennas than the first set. Alternatively, the number of selected antennas may not change. Further, the first and second set of antennas may or may not overlap. For example, one or more antennas may be common to both sets, or no antennas may be common to both sets. Still further, the second set may be identical to the first set, and thus may not reflect a change in the selected antennas.

The wireless device may use an algorithm to select the second set of antennas. The wireless device may compare the measurements of candidate antennas to the first set of antennas to calculate differences or deltas. The differences may be compared to one or more thresholds to select the second set of antennas. Further, the algorithm and the threshold(s) may depend on factors including the mode of the wireless device and the interval between measurements. In some embodiments, the measurement interval may differ between the first set of antennas and any additional activated antennas for the measurements. For example, the first set of antennas may have a shorter measurement interval because these antennas may have been continuously active (and thus available for measurements continuously) while the additional antennas may only take measurements based on a measurement interval. In some embodiments, the longer the measurement interval, the more emphasis the algorithm may place on a most recent measurement relative to one or more older measurements. For example, the algorithm may calculate a value (e.g., $Y_n$) by applying a forgetting factor (e.g., alpha) to a most recent measurement (e.g., $X_n$) and a previous calculated value (e.g., $Y_{n-1}$). An example of such a calculation may be:

$$Y_n = (1-\text{alpha}) * Y_{n-1} + \text{alpha} * X_n \qquad \text{Equation 1:}$$

Such values may be calculated for each of the candidate antennas, and differences between the calculated values may be determined, e.g., comparing one antenna to another. In some embodiments, a difference between the value of a transmission antenna of the first set (e.g., a first transmission antenna) may be compared to values of each of the other (e.g., alternative) antennas to select a transmission antenna for the second set.

The differences may be compared to thresholds to select the second set of antennas. The threshold may be based on the antenna capability, e.g., based on the sum of total isotropic sensitivity (TIS) of the receive antenna(s) and total radiated power (TRP) of the transmission antenna(s). The threshold may differ depending on the state or triggering condition. For example, a device in a connected state (e.g., data channel (DCH)) may apply an adjustment to the threshold to avoid ping-pong behavior (e.g., transitioning rapidly back and forth between sets of antennas with similar characteristics). In some embodiments, a device in a non-connected state, such as a RACH may not apply such an adjustment.

In 510, the wireless device may communicate using the second set of antennas. The device may deactivate (e.g., turn off) any antennas that are not part of the second set, and may activate any antennas of the second set that are not active. The device may use an antenna for transmission as selected for the second set. An interruption to communications may occur as a result of activating or deactivating antennas.

In some embodiments, the method may repeat one or more times. Such repetition may include any number of repetitions of trigger conditions, measurements, and selection of antenna sets.

In some embodiments, a wireless device may have hardware limitations related to demodulating component carriers (CCs), particularly to support large numbers of antennas (e.g., 4 antenna reception or 4Rx) on all component carriers. Thus, in a carrier aggregation system of several CCs, in order to support 4Rx, it may be necessary to combine higher numbers of component carriers. Accordingly, slice/CC resource allocation associated with channel aggregation may be an important consideration. In some embodiments, a base station may indicate channel aggregation. A method for performing semi-static resource allocation, may be prioritized based on the following hierarchy: a primary component carrier (PCC) that is capable of 4Rx receives first priority; a secondary component carrier (SCC) that is adjacent to a PCC capable of 4Rx receives second priority; a higher bandwidth SCC receives third priority; and a higher frequency SCC receives fourth priority. Note that other prioritization schemes are possible and may be configured as desired.

Figure 6:
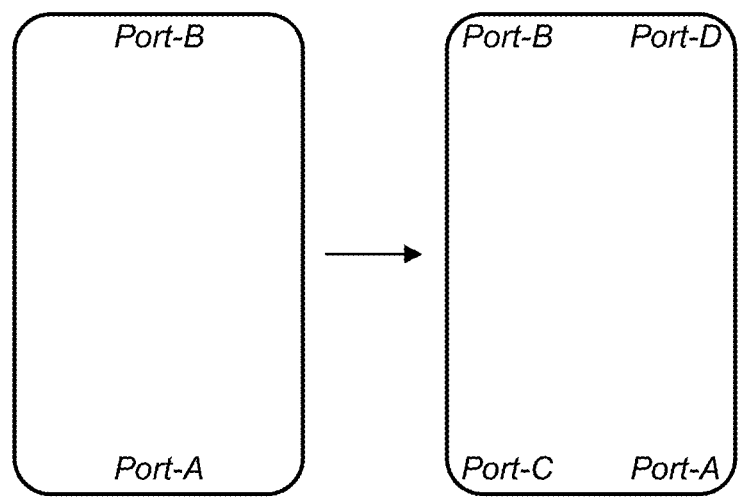
FIG. 6 is a block diagram illustrating devices including two antenna ports and four antenna ports, according to some embodiments.

FIG. 6—Two-port vs. Four-port devices

FIG. 6 illustrates the transition from devices including two antenna ports to four antenna ports. As shown, the antennas/ports may be arranged differently in the devices. Arrangement of the antennas may impact characteristics of the antennas and may impact performance based on the environment of the device. Embodiments disclosed herein may be applied with devices with any number of antennas.

FIG. 7—Scheduling Diagrams

Figure 7A:
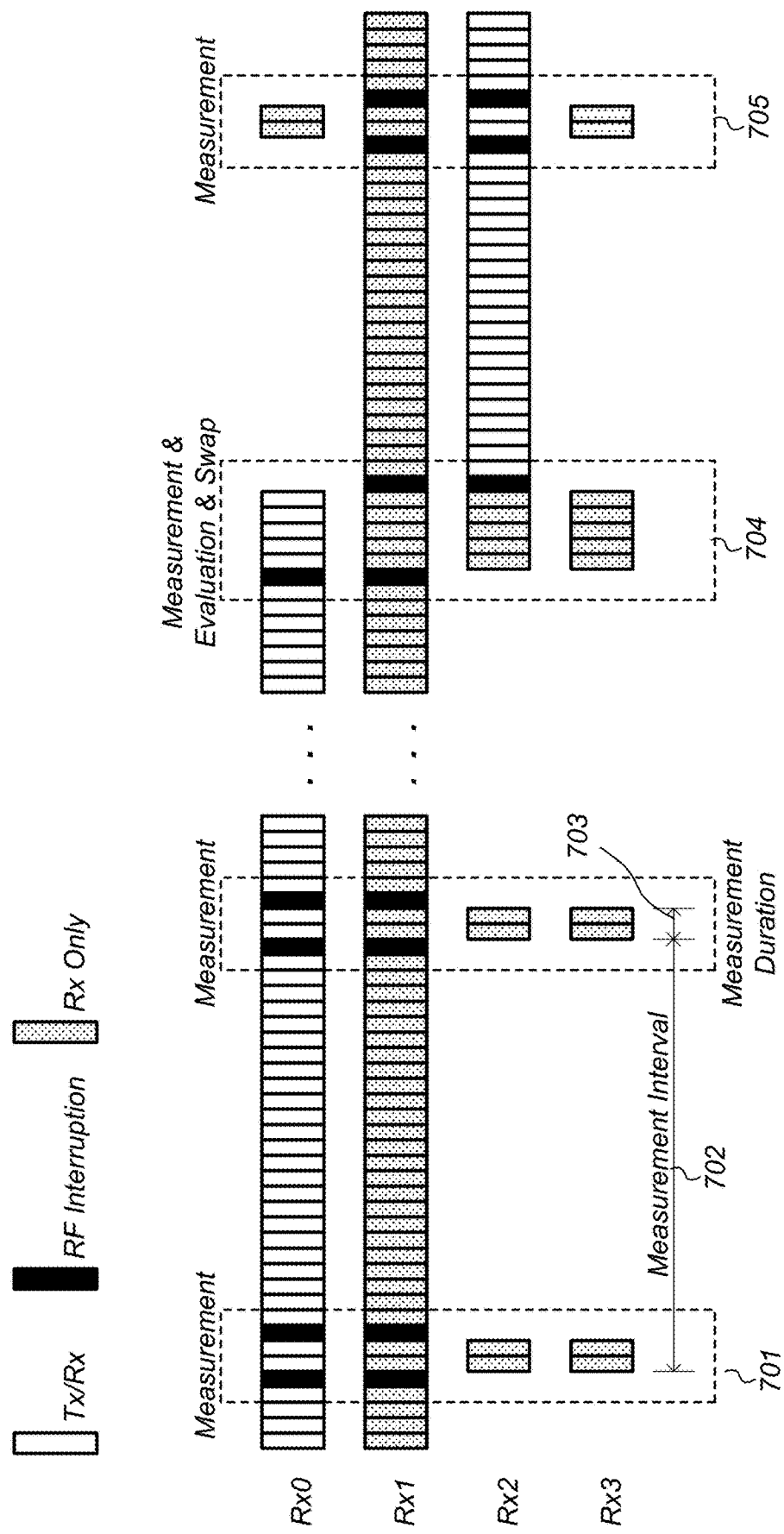
FIGS. 7A-C are scheduling diagrams, according to some embodiments.
Figure 7B:
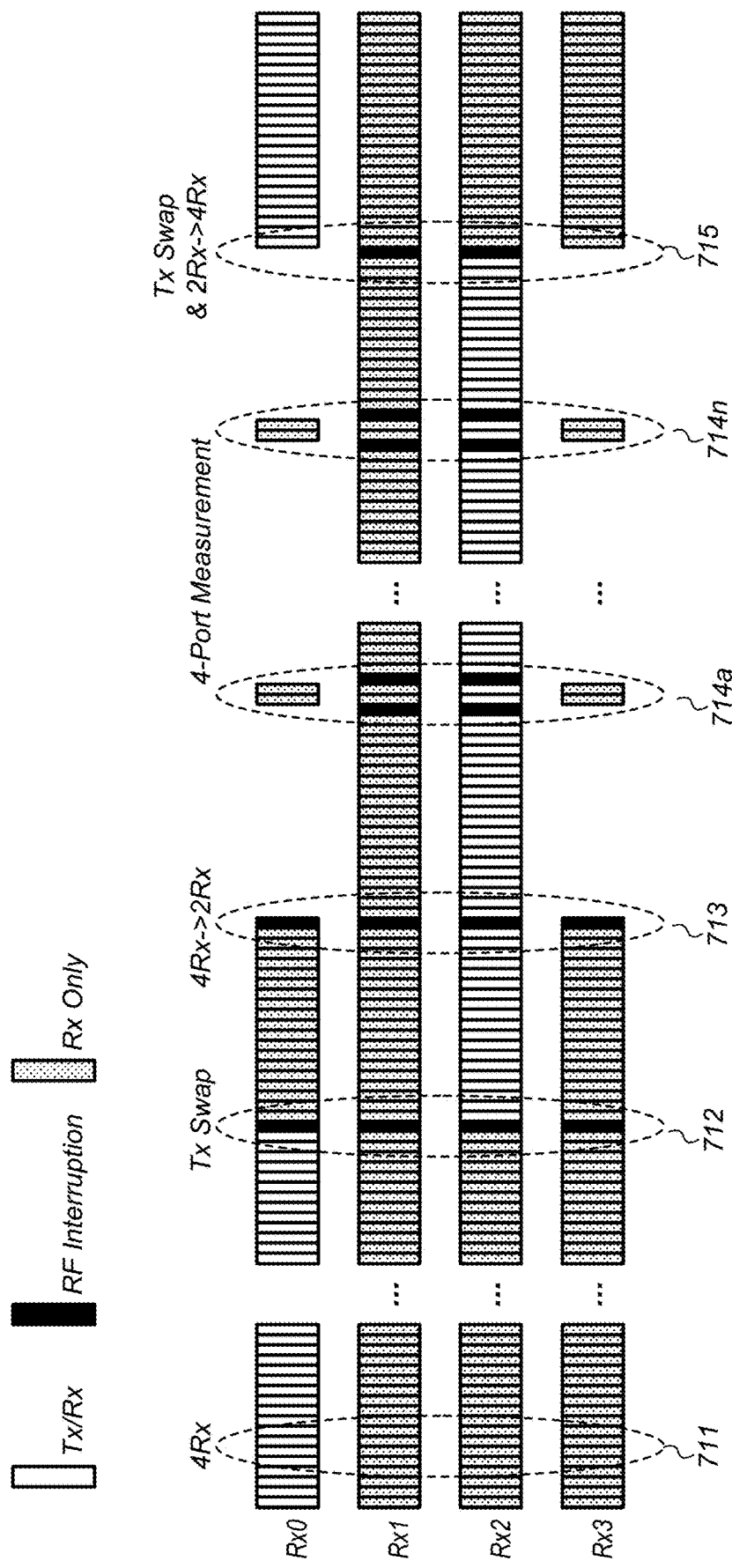
Figure 7C:
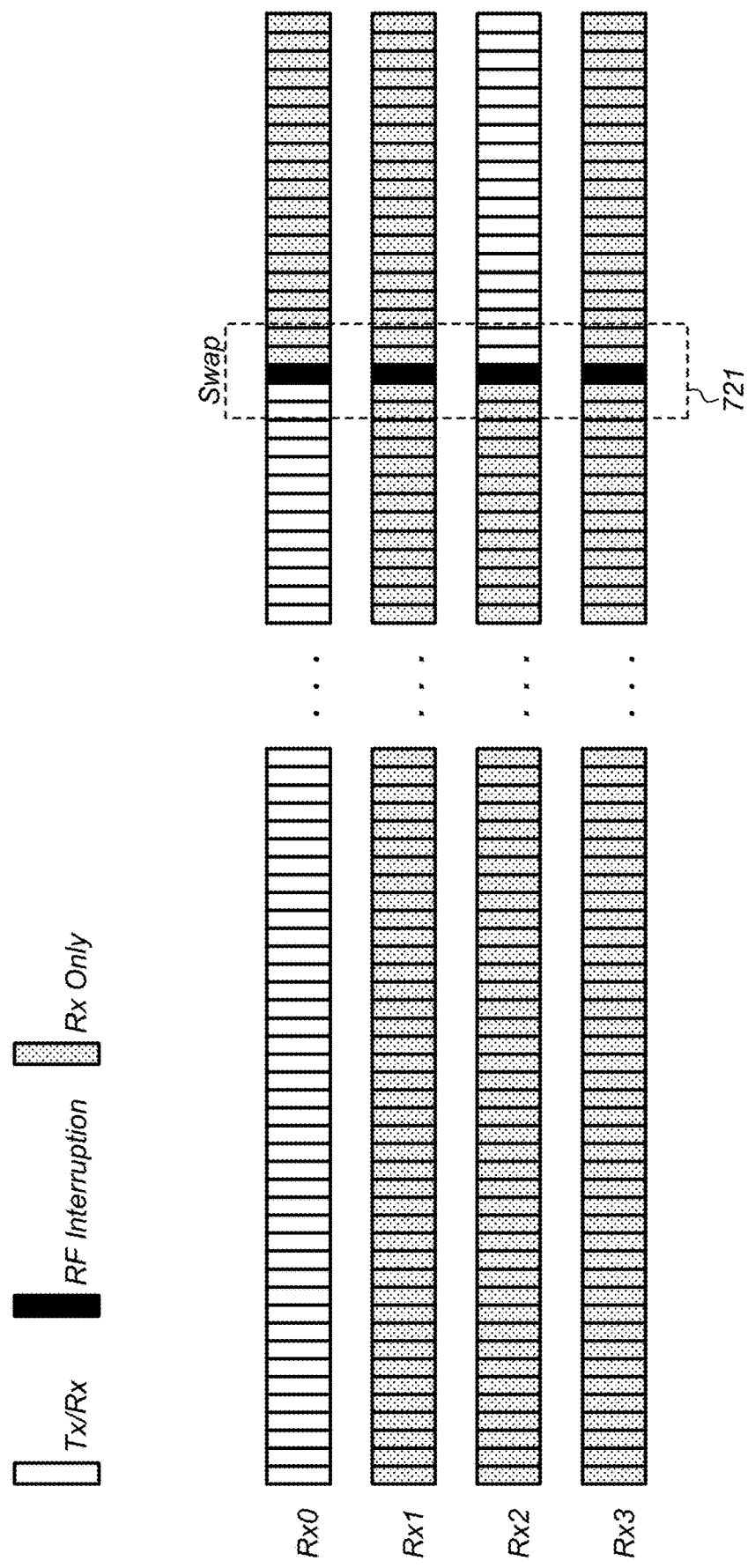

Numerous possible schedules of measurements and changes of antenna selection are possible according to embodiments of the present invention. FIGS. 7A-7C depict illustrative examples of such schedules. Note that the details (e.g., measurement durations, measurement intervals, numbers of antennas, patterns of measurements and changes in antenna sets, etc.) of these figures are illustrative only.

FIG. 7A depicts a possible schedule of a wireless device (e.g., UE 106) with four antennas (Rx0-Rx3). The wireless device may communicate according to WCDMA. As shown, the device may initially communicate with antennas Rx0 and Rx1 (e.g., the first set of antennas includes antenna Rx0 for transmission and reception (Tx/Rx) and antenna Rx1 for Rx only). The device may activate antennas Rx2 and Rx3 (701) and may take measurements for measurement durations of two frames each (703), using all antennas. The device may repeat the measurements any number of times, separated in time by measurement intervals (702). The frame immediately before and after each measurement (e.g., and/or antenna swap) may be interrupted. The device may further take a measurement and change/swap antenna sets (704). The swap may include deactivating antenna Rx0 and activating antenna Rx2 as a Tx/Rx antenna. The swap may include 5 frames during which all four antennas are active. The swap may not change the status of antennas Rx1 and Rx3. The device may take a further all-antenna measurement (705).

FIG. 7B also depicts a possible schedule of a wireless device (e.g., UE 106) with four antennas. Initially, all four antennas may be active, and antenna Rx0 is Tx/Rx, while antennas Rx1-Rx3 are Rx only. Based on measurements taken during communication (711) (e.g., without the measurements interrupting communication), the device may perform a swap to transition the Tx/Rx role to antenna Rx2; this swap may result in a 1 frame interruption for all antennas (712). Based on further measurements or another trigger condition (e.g., based on a measurement duration timer), the device may move to a two-antenna mode by deactivating antennas Rx0 and Rx3 (713). This move may result in a one frame interruption. In the two-antenna mode, the device may periodically take four-antenna measurements (714a-714n). Based on such measurements (e.g., and/or other trigger conditions) the device may change to a four-antenna mode, using antenna Rx0 as Tx/Rx (715). This change may also result in a one frame interruption.

FIG. 7C also depicts a possible schedule of a wireless device with four antennas. Initially, all four antennas are active, and antenna Rx0 is Tx/Rx, while antennas Rx1-Rx3 are Rx only. Based on measurements taken during communication (e.g., without the measurements interrupting communication), the device may perform a swap to transition Tx/Rx role to antenna Rx2; this swap may result in a one frame interruption for all antennas (721).

FIGS. 8A-8D—Transmission (Tx) Antenna Switching

Figure 8A:
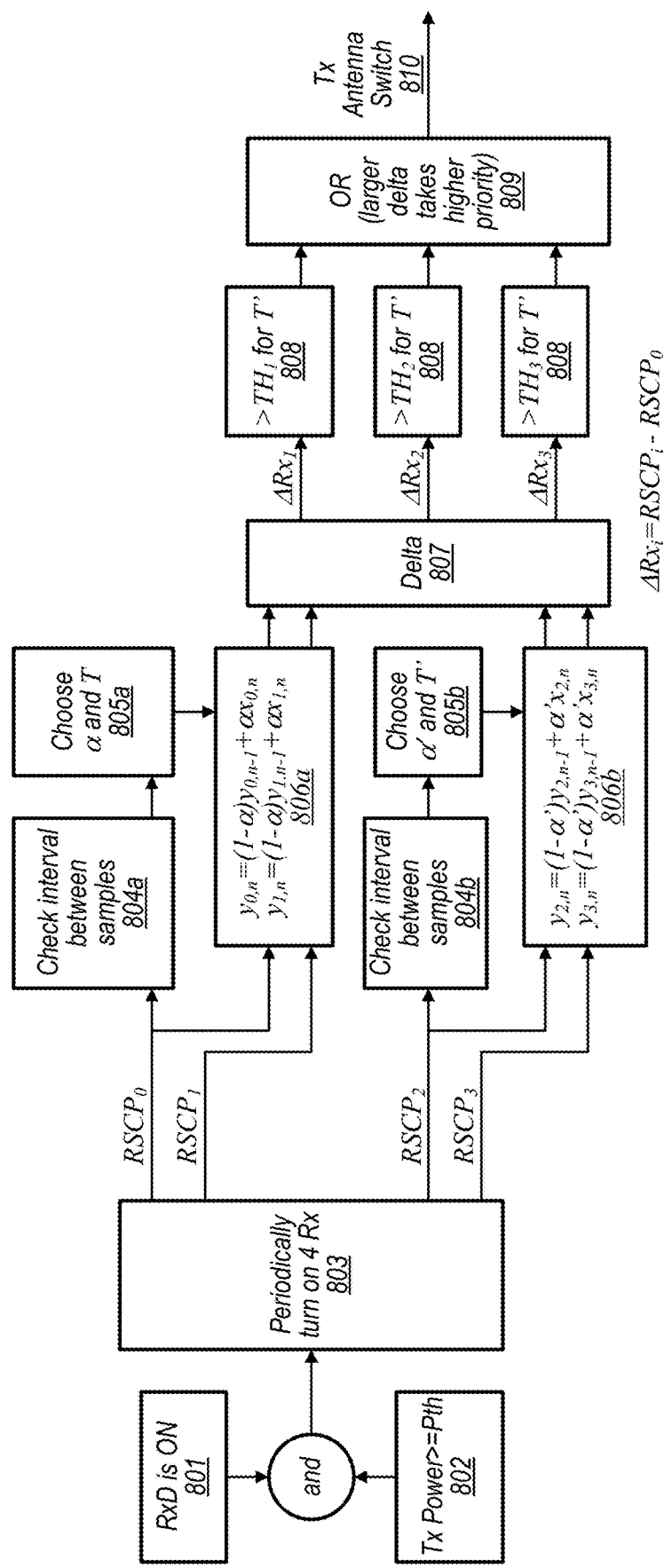
FIGS. 8A-B are flow chart diagrams illustrating methods for antenna select, according to some embodiments.

FIG. 8A illustrates an exemplary control process of adaptive multiplexing as a flow chart, particularly for the case of a device operating according to WCDMA in a DCH mode. Initially, receive diversity (e.g., RxD, indicating that at least two antennas are used for reception (e.g., antennas 0 and 1), one of which may be Tx/Rx, resulting in spatial diversity for receiving signals) may be on (801) and Tx power may be greater than or equal to a Tx power threshold (802). According to some embodiments, RxD may be locked for an initial period (e.g., 10 seconds, among other possibilities) of a DCH state, e.g., such that the set of active antennas is not reduced during this period. Based on both of these conditions (RxD on and Tx power at or above threshold) being true, the device may periodically enable additional antennas for measurement, e.g., as discussed above (803). The device may measure one or more received signal metrics for each antenna, e.g., $RSCP_0$-$RSCP_3$. The device may determine the interval between samples of the metric for each antenna (e.g., individually) (804a and 804b). As noted above, the interval may be longer for the additional antennas (e.g., antennas 2 and 3) than for the first set of antennas (e.g., antennas 0 and 1). Based on the interval and other factors, the device may determine parameters for comparing antenna measurements and selecting the second set of antennas, e.g., may select alpha and T relative to active antennas 0 and 1 (805a). As noted previously, alpha may represent a forgetting factor and T may represent an averaging period. The device may also choose alpha' and T' (e.g., analogous to alpha and T) which may be used relative to additional antennas 2 and 3 (805b). These values may be used to calculate values using an equation, such as equation 1 described above for each antenna (806a and 806b). These values may be compared to each other (e.g., determining a difference/delta between a pair of antennas) (807). In particular, values for each of the Rx-only antennas may be compared to the Tx/Rx antenna (e.g., antenna 0). Based on the delta of at least one Rx only antenna relative to the Tx/Rx antenna exceeding a threshold for T or T' (e.g., as applicable) (808), that Rx antenna may become the Tx/Rx antenna. In the case that more than one antenna exceeds such a threshold, the antenna with the larger delta (e.g., which may offer the largest potential improvement) may be selected (809). The device may then proceed to switch to the selected Tx/Rx antenna (810).

Figure 8B:
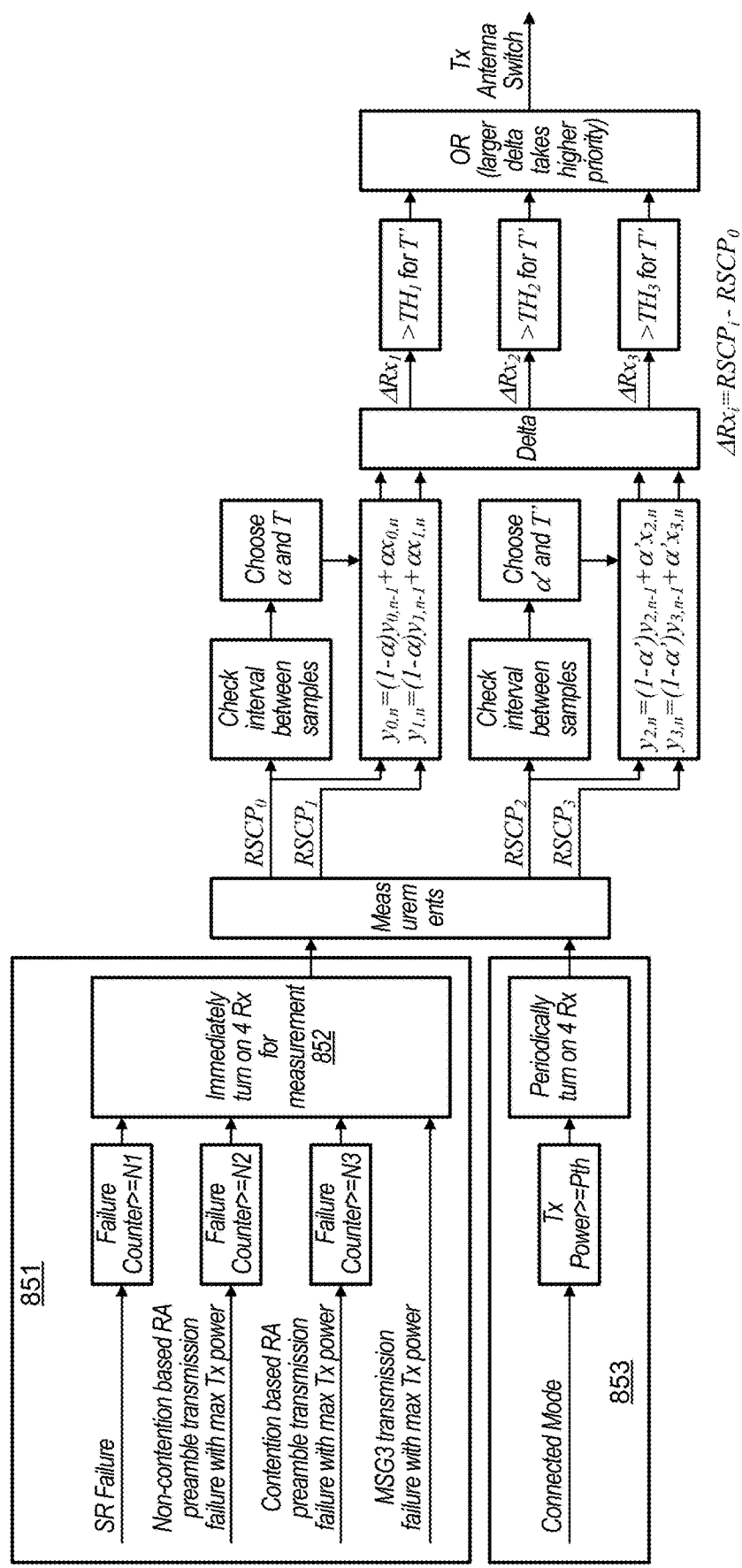

FIG. 8B illustrates an exemplary control process of adaptive multiplexing as a flow chart, particularly for the case of a device operating according to LTE. In some embodiments, if an event triggered mechanism (e.g., trigger condition related to a failure) occurs (851), the device may immediately turn on additional (e.g., or all) antennas for radio measurements (852). As illustrated, exemplary failure-related trigger conditions may include SR failure, RACH failure, or MSG3 failure, among other possibilities. Each such trigger condition may specify a threshold for the number, frequency, or rate of events (e.g., N1, N2, N3). Further, there may be combined trigger thresholds (e.g., including multiple types of failures). In some embodiments, a device in connected mode may periodically turn on additional (e.g., all) antennas for measurements (853). A device may or may not apply a transmission power threshold. The device may then take measurements (e.g., RSCP) using all active antennas. The method may then proceed as discussed with respect to FIG. 8A.

FIG. 8C includes a table of exemplary values of parameters alpha (e.g., and/or alpha'), T (and/or T'), and threshold (TH) for various measurement intervals. FIG. 8D illustrates equations for calculating the threshold (e.g., calculating D) for DCH or RACH conditions. Note that i corresponds to the antenna being compared to the Tx/Rx antenna, e.g., antenna 0. Thus in the cases illustrated by FIGS. 8A-B, for a device with four antennas, i may be equal to 1, 2, or 3.

It will be appreciated that FIGS. 8A-8D are exemplary only and that similar methods may apply to devices with other numbers of antennas, other modes, other communication standards, etc. Further, alternative control processes and/or alternative parameter values and calculations, corresponding to additional embodiments, may be configured for any of the illustrated or non-illustrated modes and standards.

FIGS. 9A-9C and 10—Finite State Machine (FSM) Diagrams and MIMO Modes

Figure 9A:
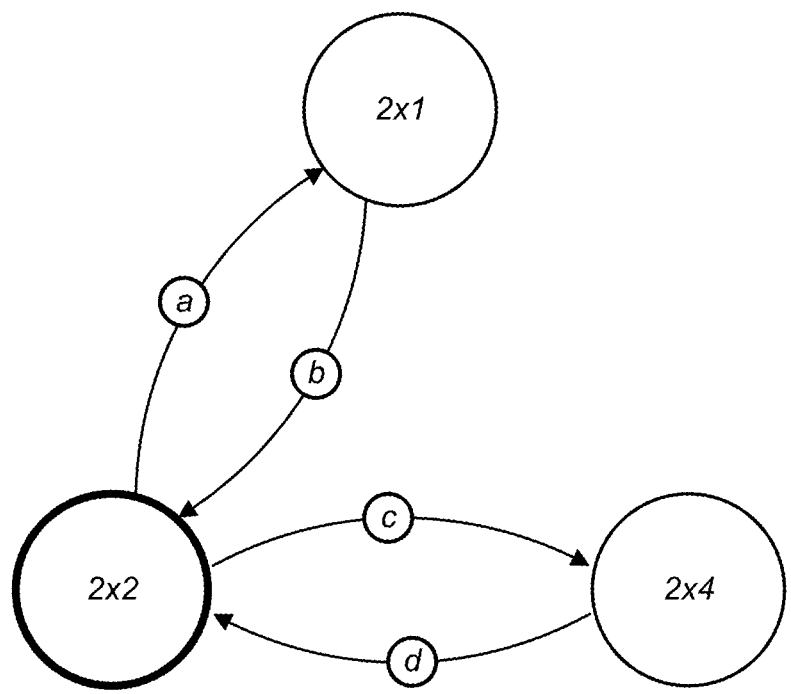
Figure 9B:
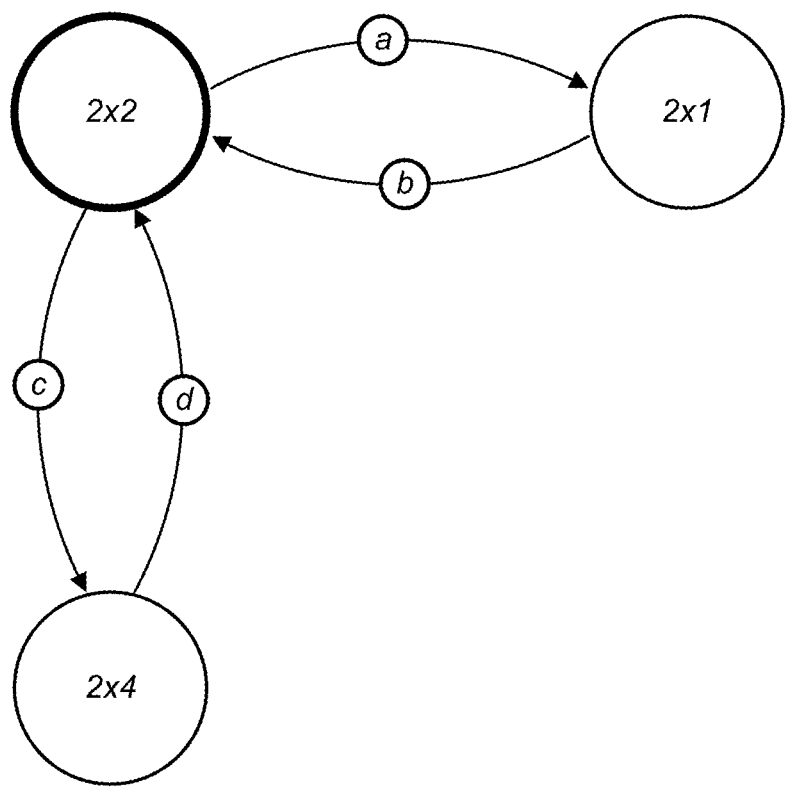
Figure 9C:
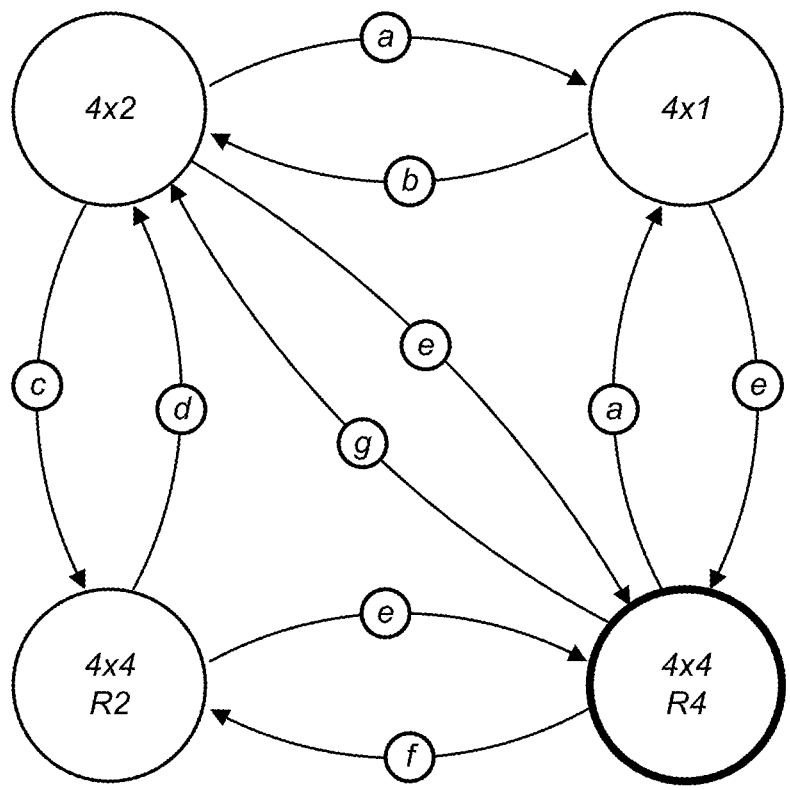

FIGS. 9A-9C illustrate exemplary FSM diagrams. However, the provided conditions for transitioning between states are exemplary only and are not limiting.

In more detail, FIG. 9A depicts an exemplary FSM diagram of a wireless device operating in an LTE idle mode. The device may be in communication with a base station, e.g., using two-layer MIMO. As shown, the device may transition between using a single receive antenna (e.g., 2×1), two receive antennas (2×2), or four receive antennas (2×4) based on conditions. Note that the minimum number of antennas used by the device may be as high (e.g., at least as high) as the number of MIMO layers. For example, in two-layer MIMO, at least two transmit and two receive antennas (e.g., 2×2) may be used, according to some embodiments. The table shown in FIG. 9A summarizes exemplary conditions that may lead to each transition. In case a, a dynamic RxD (DRxD) condition may be satisfied (e.g., may be met) and the device may deactivate one of the two active antennas to enter a 2×1 mode. DRxD may refer to the condition that 1) SNR (e.g., or another received signal metric or combination of metrics) exceeds a threshold and 2) the device has been inactive (e.g., the base station has not scheduled the UE) for at least a threshold amount of time. In DRxD conditions, a wireless device may use fewer antennas to receive because during an inactive period the UE may only monitor control channels (e.g., PDCCH). A wireless device in DRxD may be able to decode control channel messages using only a single antenna (e.g., as noted above, in DRxD conditions, SNR and/or other metrics may be good). In case b, a DRxD condition may not be satisfied or is no longer satisfied (e.g., SNR may fall below a threshold), and the device may activate a second antenna to enter a 2×2 mode. In case c, each of the listed conditions may be met including: both RSRP and SNR (among other possible combinations of one or more received signal metrics) falling below a threshold, a prohibit timer expiring, and RxD is on (e.g., the device is using 2 antennas). The device may start a measurement duration timer (e.g., on-duration timer) upon entering 2×4 mode, and may remain in that state for a duration of time shorter than (e.g., or up to) the duration of the measurement duration timer. In case d, the device may enter 2×2 mode if any of the listed conditions is satisfied, e.g., if received signal measurements such as RSRP or SNR exceed a threshold, if the device is configured for a single antenna receive mode (e.g., RxD is off), or if a measurement duration timer expires.

FIG. 9B depicts an exemplary FSM diagram of a wireless device operating in an LTE connected mode, with a MIMO scheme up to two layers. In some embodiments, a 2×2 mode may be a default mode. In case a, the device may transition to 2×1 in response to DRxD conditions (e.g., because it may monitor for a control channel message such as PDCCH). In case b, the device may transition to 2×2 based on detecting an uplink or downlink grant; such a transition may improve performance relative to the granted resources. In case c, the device may transition to 2×4 mode based on one or more trigger conditions, e.g., to take measurements with all antennas, due to an out of sync condition, or in order to improve TPR. In case d, the device may transition to 2×2 following measurements (e.g., with or without changing to a different set of two active antennas based on the measurements) or in order to improve TPR. Further, in case d, the device may transition to 2×2 based one or more applications running on the device. For example, voice over LTE (VoLTE) may typically use single layer retransmission, thus during a VoLTE call a device may select 2×2.

FIG. 9C depicts an exemplary FSM diagram of a wireless device operating in an LTE connected mode, with a MIMO scheme up to four layers. In some embodiments, a 4×4 mode with rank 4 (e.g., R4) may be a default mode, which may offer high throughput relative to other possible modes. Cases a, b, c, and d may be similar to those shown in FIG. 9B. In case e, the device may move to a 4×4 mode with rank 4 based on an improvement in the allocated rank to 4 or a rank 4 grant. In case f, the device may similarly respond to an indicated change to rank 2 or may transition to rank 2 in order to improve TPR. In case g, the device may detect DRxD conditions (e.g., may become inactive and may monitor for a control channel message). Similar to case d, in case g, the device may transition to 4×2 based on an application such as VoLTE.

FIG. 10 is a table illustrating various possible MIMO configurations, and describing each such configuration. Each configuration is characterized by a maximum number of MIMO layers and a maximum number of receive antennas applicable to that configuration.

It will be appreciated that FIGS. 9A-C and 10 are exemplary only and that similar methods and FSMs may apply to devices with other numbers of antennas, other modes, other communication standards, etc. Further, alternative FSMs, corresponding to additional embodiments, may be configured for any of the illustrated or non-illustrated modes and standards.

Figure 11A:
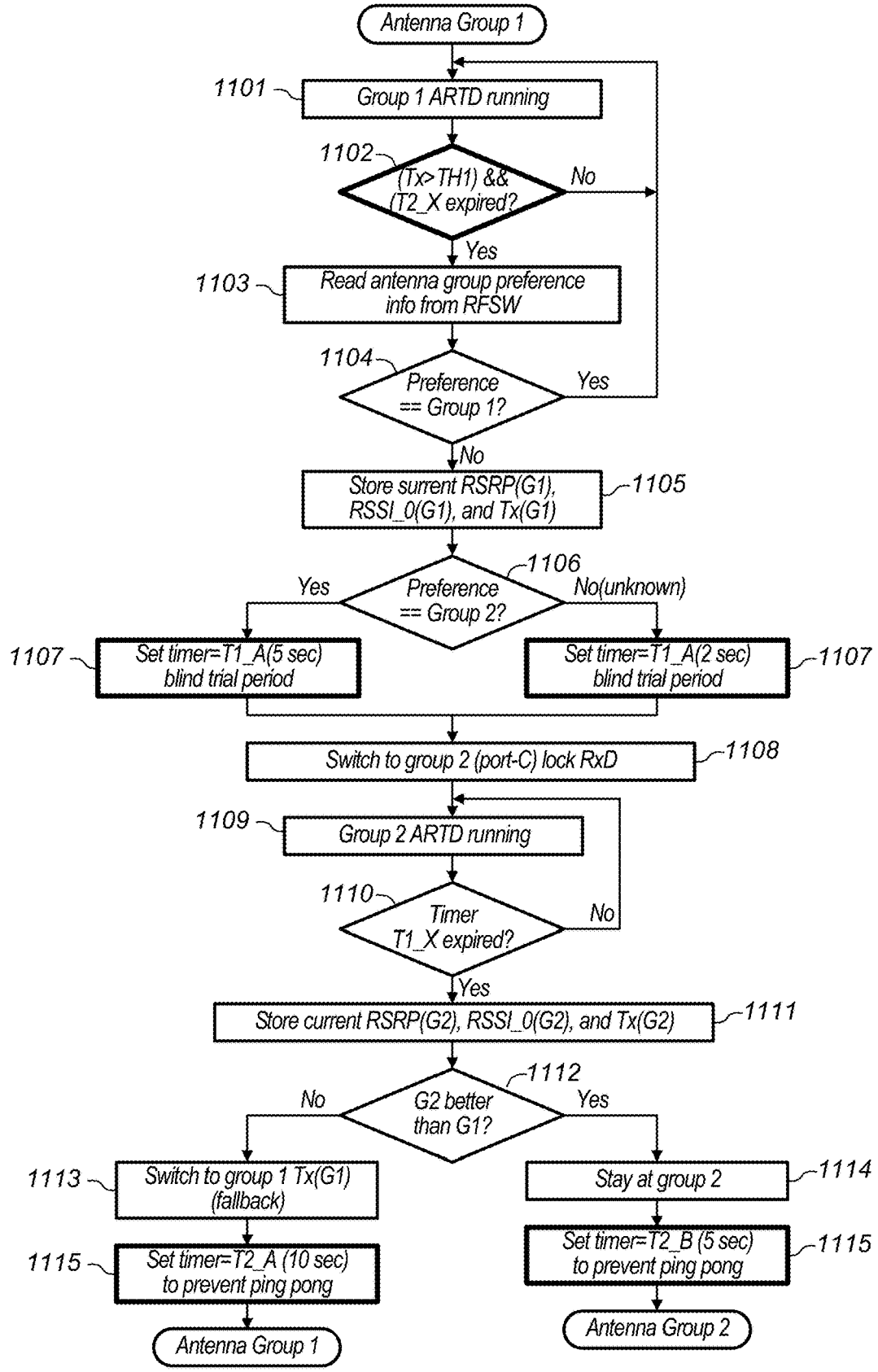
FIGS. 11A-B are flow chart diagrams illustrating antenna group selection, according to some embodiments.
Figure 11B:
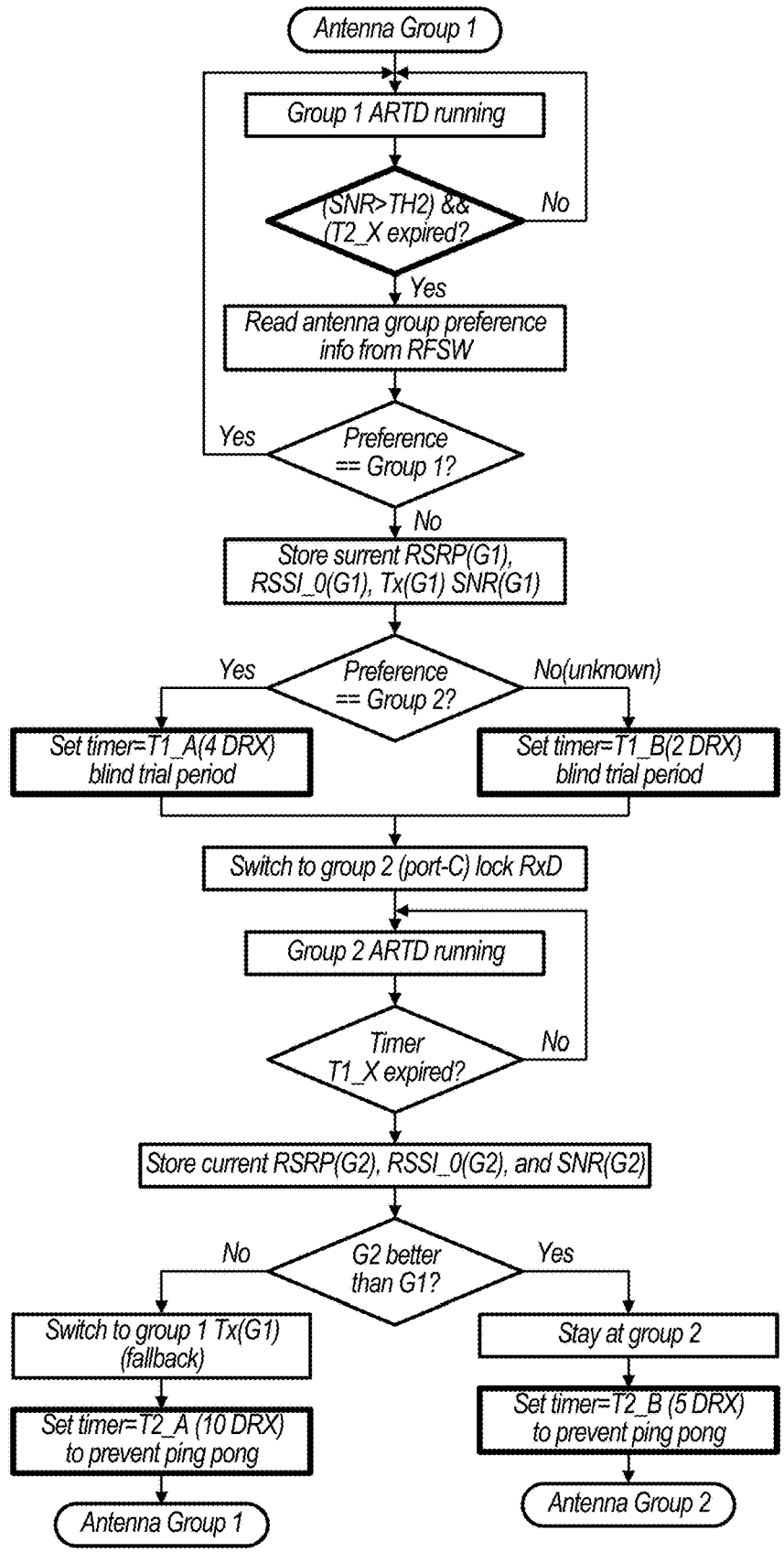

FIGS. 11A-B—Flowcharts of Antenna Group Selection

In some embodiments, the antennas of a wireless device can be selected based on antenna groups. For example, some devices may have hardware limitations that may allow antenna group selection, but not selection of individual antennas. FIGS. 11A-B illustrate exemplary selection processes for UE devices using two antenna groups of two antennas each. As illustrated, such groups may be group 1 (including port-A and port-B) and group 2 (including port-C and port-D). For a UE operating with group 1, Tx may be either port-A or port-B, and Rx can be port-A+ port-B concurrently (receive diversity). In other words, port-A may be Tx/Rx and port-B may be Rx only (to provide receive diversity). Alternatively, the roles may be reversed so that port-B is Tx/Rx and port-A is Rx only. Transmission and reception roles of ports C and D may similarly be divided for group 2. Note that the illustrated processes, groupings, and roles are exemplary only, and that various other processes and embodiments are possible, including for UEs with different numbers of antennas and/or antenna groups. Further, although the illustrated processes "start" with a device using group 1, group 2 may be substituted as desired. Still further, the parameters (e.g., timer values, thresholds, specific metrics used, weights of metrics to use a custom weighted metric, etc.) may be configured as desired.

FIG. 11A illustrates a selection process for a device operating in connected mode. As shown, the device may begin operating with a group 1 ARTD process running (1101). In the ARTD process, the UE may periodically check if trigger conditions exist to consider changing antenna groups (1102). Such trigger conditions may include transmission power (Tx) exceeding a threshold (among other possible metrics or groups of metrics) and/or expiration of a timer (e.g., a ping-pong timer). If trigger conditions exist, the UE may access antenna group preference information (1103). Such preference information may be predetermined, or may depend on conditions. The preference information may be accessed from radio frequency software (RFSW), the network (e.g., base station or access point, etc.), and/or a sensor, etc. If a preference is found for group 1 (1104), the process may return to group 1 ARTD running. If no preference is found for group 1, the process may store current measurements associated with group 1 (e.g., G1), such as RSRP, RSSI, and Tx power (1105). Then, the device may determine whether or not a preference is found for group 2 (1106). The UE may start a blind trial timer (T1), the duration of which may depend on whether or not a preference is found for group 2, e.g., if a preference is found (e.g., for group 2), the timer may be longer than if no preference is found (1107). The device may switch to group 2, lock RxD (1108), and initiate group 2 ARTD (1109), which may run for the duration of the blind trial timer. Once the blind trial timer expires (1110), the device may store measurements associated with group 2, such as RSRP, RSSI, and Tx power (1111). The device may compare the stored measurements (e.g., Tx power, among other possibilities) of the two groups (1112). Based on the comparison, the device may fall back to group 1 (1113) or may continue to use group 2 (1114). The UE may start a ping-pong (T2) timer (1115), the duration of which may depend on the selected group (e.g., it may be longer in the case of falling back to group 1). The method/process may repeat indefinitely (e.g., return to 1101, with the selected antenna group).

FIG. 11B illustrates a selection process for a device operating in idle mode (e.g., DRX). The selection process may be similar to the connected mode process, but various differences may be configured as desired. One difference may be that SNR may be used as a trigger condition rather than Tx power. A second difference may be that the durations of the ping-pong and/or blind trial timers may be configured as a number of DRX cycles.

FIGS. 12A-16D—Throughput/Power Ratio (TPR)

As discussed herein, TPR may serve a variety of purposes in various embodiments. For example, TPR may serve as a trigger condition to initiate measurements using additional or all antennas. In some embodiments, if the TPR of an active set of antennas falls below a threshold, e.g., an absolute threshold or an anticipated TPR of an alternative set of antennas, measurements may be triggered. As a second example, TPR may serve as a selection criteria for selecting a set of antennas to activate (or to remain active, etc.), e.g., a candidate set with the highest TPR (e.g., as measured or as estimated) may be selected, according to some embodiments. In some embodiments, TPR may be calculated or estimated in various ways, and the nature of the calculation may depend, at least in part, on what metrics are available. The methods and equations below are exemplary only. In particular, it should be noted that the methods described herein are presented for a device with four antennas, however similar methods could be applied to different numbers of antennas.

FIG. 12A depicts equations for determining TPR based on full mutual information (MI). Full MI may include channel estimation and interference estimation for each antenna, modulation and coding scheme (MCS), CQI, and/or additional information. Full MI be a relatively precise basis for estimating TPR, in comparison to some alternatives discussed below, and thus may be preferred if full MI is available. In the equations, gamma ($\gamma$) may represent the scheduling rate. $P_{4Rx}$ may represent the power cost of 4Rx and $P_{2Rx}$ the cost of 2Rx. Thus, in each equation, TPR may be directly proportional to the scheduling rate multiplied by the summation of an MI factor over all antennas. TPR may be inversely proportional to power cost. In the second equation, only 2 antennas are used, thus there are 6 possible combinations of 2 antennas that are candidate sets for receiving rank 2 transmissions and the summation is calculated for the combination of 2 antennas with the best MI.

FIG. 12B depicts equations for determining TPR based on SNR. SNR may be a relatively imprecise metric for determining TPR. The logarithm of SNR may be a theoretic approximation of full MI.

A third alternative for calculating or estimating TPR may be based on antenna imbalance and correlation. This calculation may offer greater precision than using SNR, but less precision than full MI. FIGS. 13A-15E illustrate equations that may be used to calculate TPR from antenna correlation (e.g., beta or $\beta$) and antenna imbalance (alpha or $\alpha$).

Figures 13A, 13B, 13C, 13D:
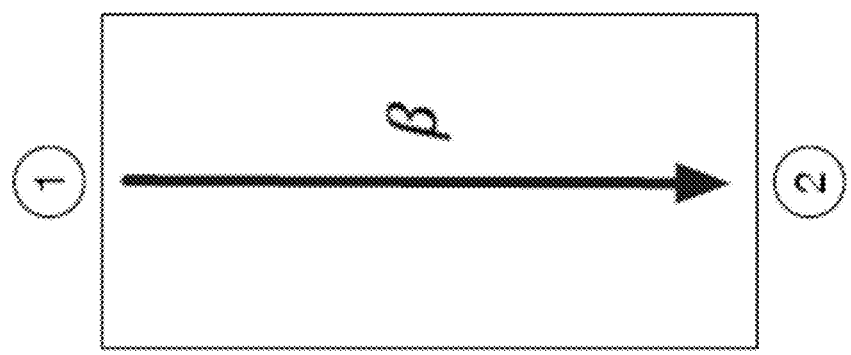

FIGS. 13A-D illustrate antenna imbalance and correlation in the case of 2×2 MIMO. FIG. 13A illustrates correlation (beta) between two antennas. FIG. 13B is a channel model, where H models the antenna imbalance (FIG. 13C) and K models the antenna correlation (13D).

Figures 14A, 14B, 14C:
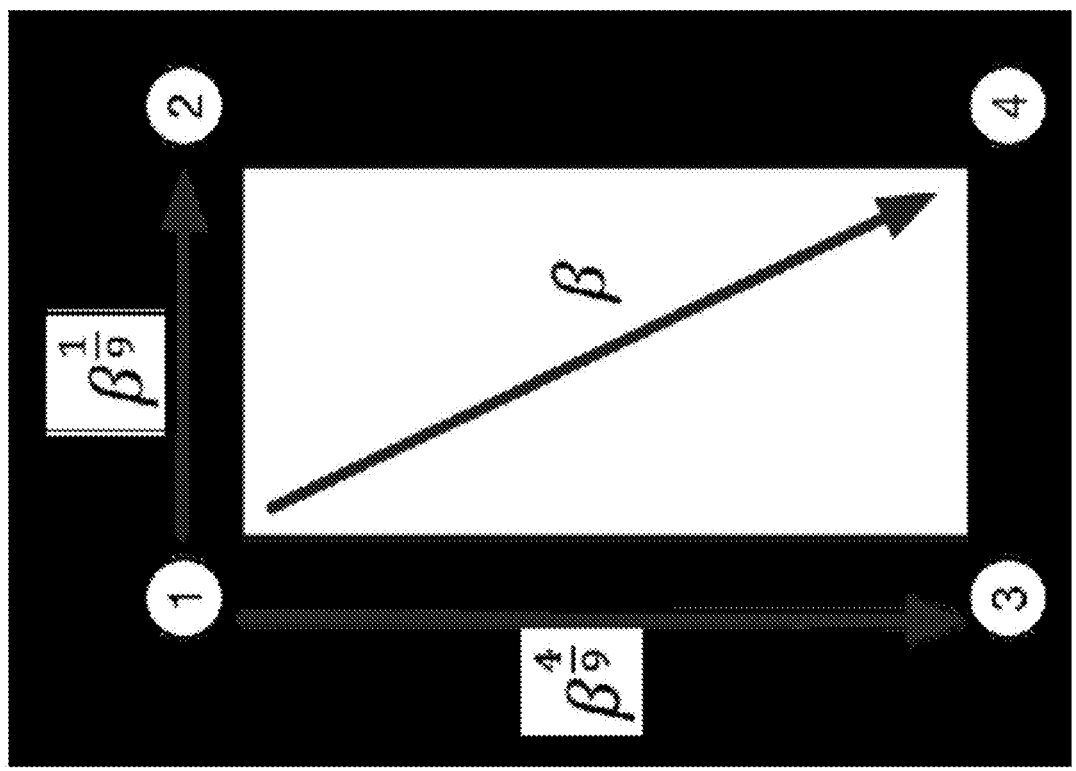

FIGS. 14A-C is similar to FIGS. 13A-D, for the case of 4×4 MIMO. FIG. 14A illustrates beta for 4 antennas. FIG. 14B illustrates correlation, based on calculations of 3GPP 36.101 Annex B. FIG. 14C illustrates antenna imbalance, assuming a portrait mode handgrip. A portrait grip may be typical for web browsing, in some embodiments.

FIGS. 15A-E illustrate the calculation of TPR based on alpha and beta. FIG. 15A illustrates the calculation of capacity (e.g., C) for transmission mode 4 (TM4) given the identity illustrated in FIG. 15B and the MIMO channel of FIG. 15C. Lamda$_i$ ($\lambda$) represents the singular value of HH* and SNR may be defined as $1/N_0$. This calculation may represent the case that channel state information associated with both the transmitter and receiver is available. FIG. 15D represents the calculation of capacity with receiver CSI only (e.g., TM3). FIG. 15E are equations for calculating TPR based on the capacity.

Figure 16A:
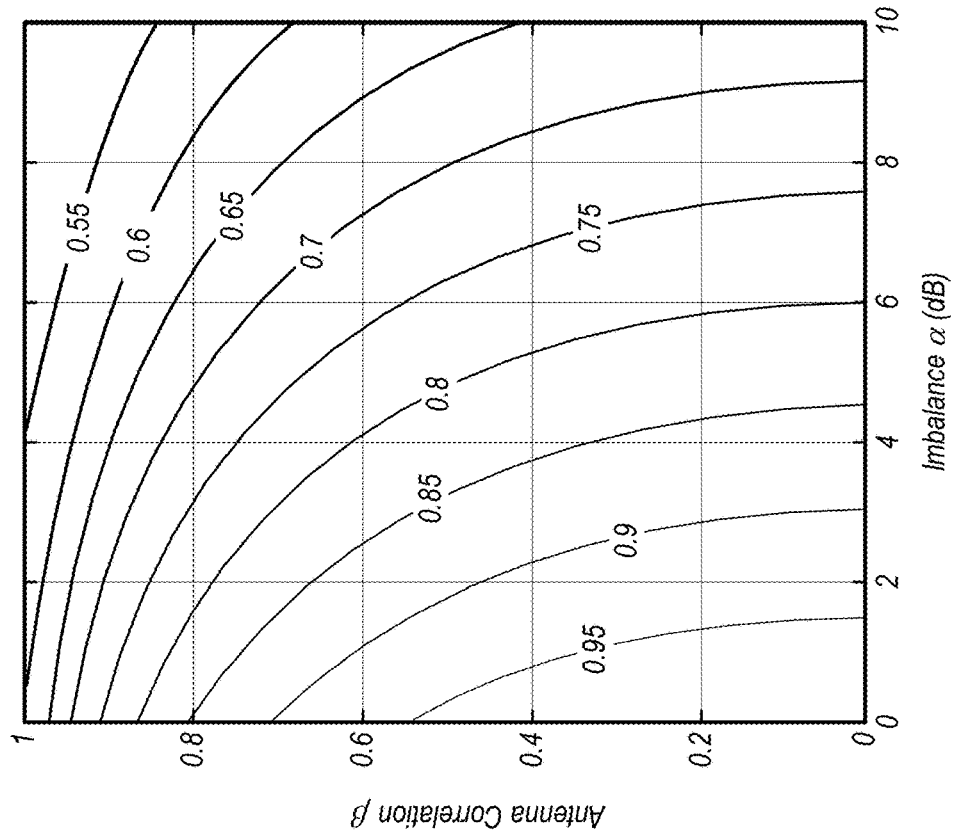
Figure 16B:
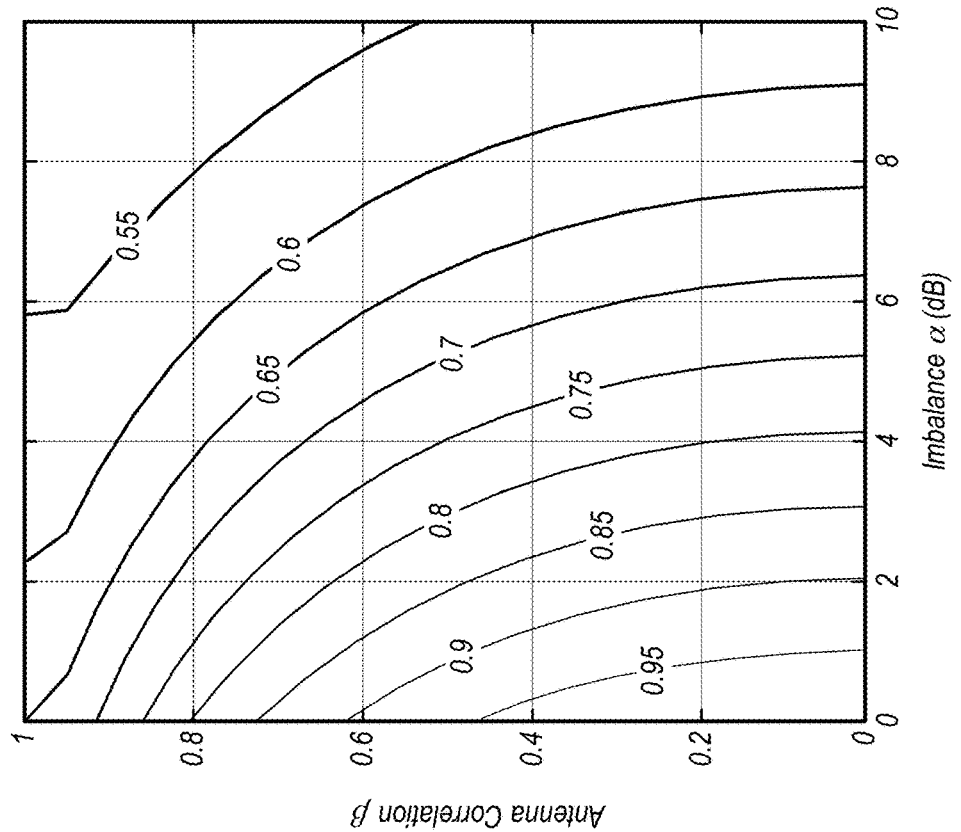
Figure 16D:
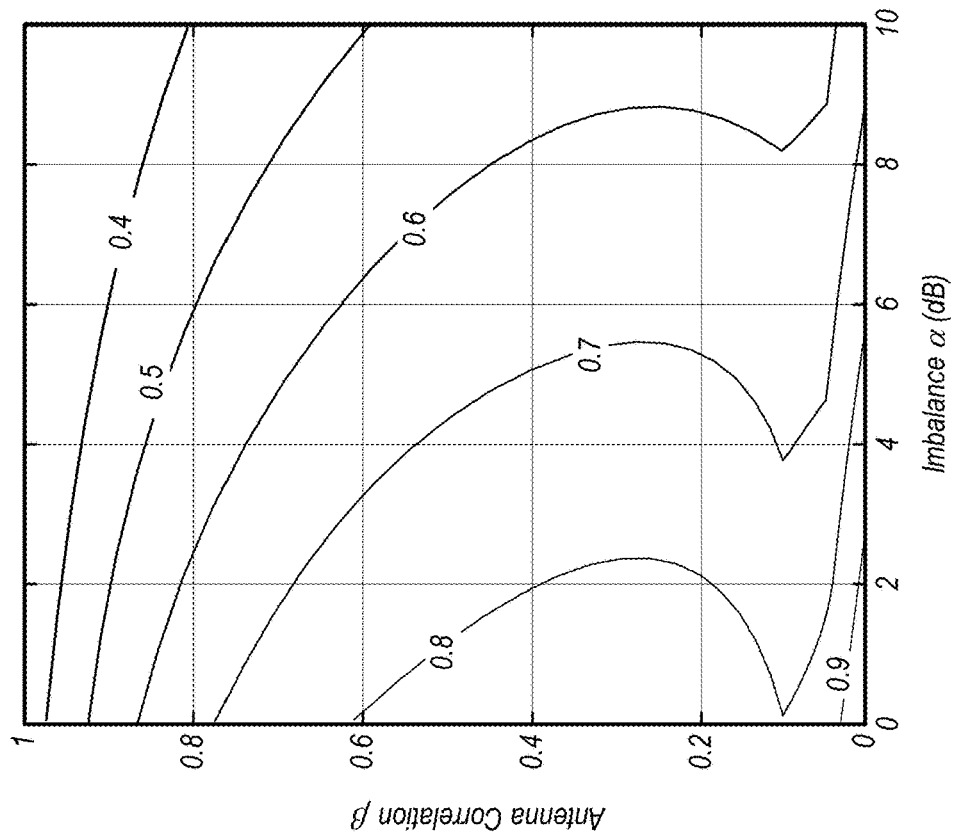
Figure 16C:
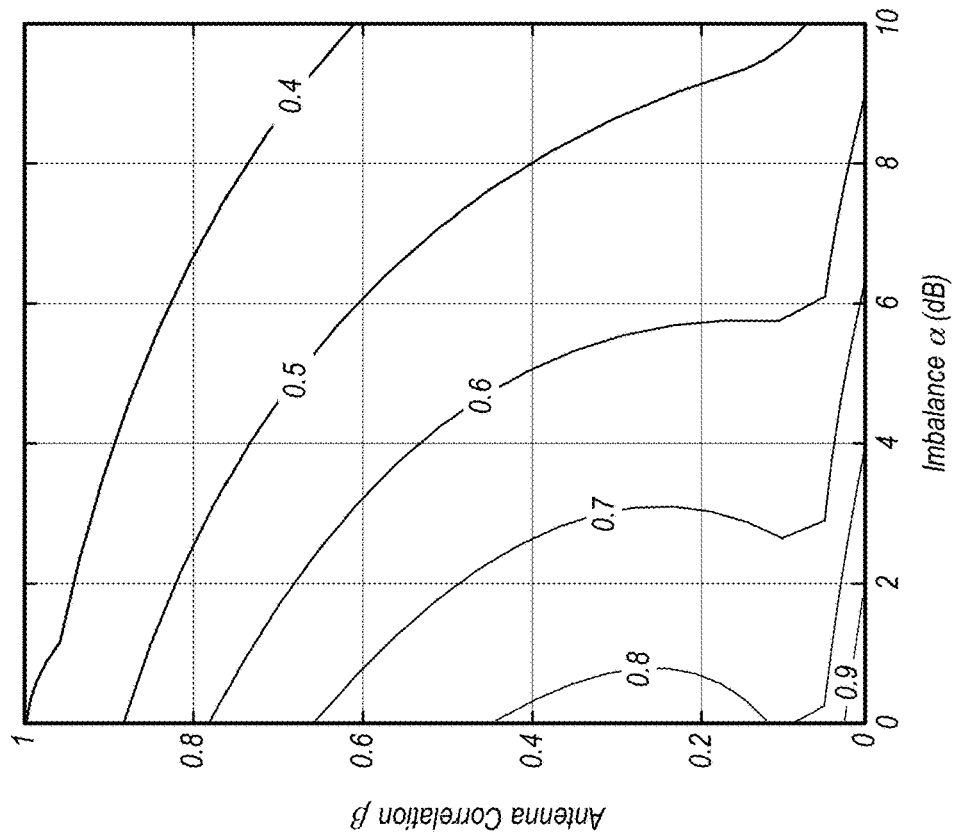

FIGS. 16A-D depict theoretic capacity as a function of correlation (beta) and imbalance (alpha). FIG. 16A may represent the case of 2×2 MIMO with SNR of 20 dB. FIG. 16B may represent the case of 2×2 MIMO with SNR of 30 dB. FIG. 16C may represent the case of 4×4 MIMO with SNR of 20 dB. FIG. 16D may represent the case of 4×4 MIMO with SNR of 30 dB.

In the following, exemplary embodiments are provided.

In one set of embodiments, a method for operating a wireless user equipment (UE) device, may include: communicating with a base station using a first set of antennas; determining one or more trigger conditions for performing antenna measurements; based on the one or more trigger conditions, performing antenna measurements for at least the first set of antennas; based on the antenna measurements, selecting a new set of antennas for communicating with the base station, wherein the new set of antennas are different than the first set of antennas; and communicating with the base station using the new set of antennas.

According to some embodiments, the one or more trigger conditions may comprise at least one of: transmission power exceeding a transmission power threshold; a received signal metric falling below a received signal threshold; or detecting a failure or out of service event.

According to some embodiments, the one or more trigger conditions may comprise expiration of a timer, wherein the timer measures the time since a previous measurement.

According to some embodiments, the method may further comprise: determining that the UE device is in an idle mode; enabling additional antennas prior to taking measurements, wherein the additional antennas and the first set of antennas are used for taking measurements; starting a measurement duration timer when the additional antennas are enabled; wherein said selecting the new set of antennas is completed at or prior to expiration of the measurement duration timer.

According to some embodiments, the combination of the additional antennas and the first set active antennas may comprise four antennas.

According to some embodiments, the new set of antennas may comprise fewer than four antennas.

According to some embodiments, the measurement duration timer may comprise a number of consecutive discontinuous reception (DRX) cycles.

According to some embodiments, taking measurements may comprise taking one or more measurements at each of the consecutive DRX cycles.

According to some embodiments, the method may further comprise: determining a throughput/power ratio (TPR) of the first set of antennas, wherein the one or more trigger conditions comprise the TPR ratio of the first set of antennas falling below a TPR ratio threshold.

According to some embodiments, the TPR may be based on one of: a signal to noise ratio (SNR); full mutual information; or antenna imbalance and correlation.

According to some embodiments, the method may further comprise: receiving a configuration indication from a base station, wherein the configuration indication specifies channel aggregation; and performing semi-static resource allocation, wherein the semi-static resource allocation is prioritized based on: a primary component carrier (PCC) that is capable of 4Rx receives first priority; a secondary component carrier (SCC) that is adjacent to a PCC capable of 4Rx receives second priority; a higher bandwidth SCC receives third priority; and a higher frequency SCC receives fourth priority.

According to some embodiments, selecting the new set of antennas may comprise changing which antenna is used for transmission from a first antenna to a second antenna, wherein the second antenna is selected based on comparing a measurement of the first antenna to a measurement of the second antenna.

According to some embodiments, comparing the measurement of the first antenna to the measurement of the second antenna may comprise: calculating a difference between the measurement of the first antenna and the measurement of the second antenna; comparing the difference to a threshold, wherein the threshold is based on at least one of: the total isotropic sensitivity of one or more receiver antennas, and the maximum radiated power of the first antenna.

According to some embodiments, a method for operating a wireless user equipment (UE) device, may comprise: communicating with a base station using a first set of antennas; determining one or more trigger conditions; based on the one or more trigger conditions: turning on a second set of antennas, different from the first set of antennas; performing antenna measurements for the first set of antennas and the second set of antennas; based on the antenna measurements, selecting a new set of antennas for communicating with the base station, wherein the new set of antennas are different than the first set of antennas; turning off a remaining set of antennas based on selecting the new set of antennas; and communicating with the base station using the new set of antennas.

Another exemplary embodiment may include a wireless device, comprising: an antenna; a radio coupled to the antenna; and a processing element operably coupled to the radio, wherein the device is configured to implement any or all parts of the preceding examples.

A further exemplary set of embodiments may include a non-transitory computer accessible memory medium comprising program instructions which, when executed at a device, cause the device to implement any or all parts of any of the preceding examples.

A still further exemplary set of embodiments may include a computer program comprising instructions for performing any or all parts of any of the preceding examples.

Yet another exemplary set of embodiments may include an apparatus comprising means for performing any or all of the elements of any of the preceding examples.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus for managing antenna selection of a wireless user equipment device (UE), the apparatus comprising:

at least one processor configured to cause the UE to:
communicate with a base station using a first set of antennas of the UE;
determine a throughput/power ratio (TPR) of the first set of antennas, wherein the TPR of the first set of antennas is based on power use associated with the first set of antennas;
determine a TPR of a second set of antennas of the UE, wherein the second set of antennas is different than the first set of antennas, wherein the TPR of the second set of antennas is based on power use associated with the second set of antennas;
compare the TPR of the second set of antennas to the TPR of the first set of antennas;
select, based on the comparison, one of the first set of antennas or the second set of antennas; and
exchange data with the base station using the selected set of antennas.

2. The apparatus of claim 1, wherein the TPR of the first set of antennas is based on one of:
a signal to noise ratio (SNR); or
full mutual information.

3. The apparatus of claim 1, wherein the TPR of the first set of antennas is based on antenna imbalance and correlation.

4. The apparatus of claim 1, wherein the processor is further configured to cause the UE to:
determine that the TPR of the first set of antennas is below a threshold; and
activate the second set of antennas in response to the determination that the TPR of the first set of antennas is below the threshold.

5. The apparatus of claim 4, wherein the processor is further configured to cause the UE to:
perform antenna measurements using the second set of antennas, wherein the TPR of the second set of antennas is determined based on the antenna measurements.

6. The apparatus of claim 1, wherein the processor is further configured to cause the UE to:
determine that a transmission power using the first set of antennas is above a threshold; and
activate the second set of antennas in response to the determination that the transmission power using the first set of antennas is above the threshold.

7. The apparatus of claim 1, wherein the TPR of the second set of antennas is based on a lookup table.

8. A user equipment device (UE), comprising:
a plurality of antennas; and
a processor operatively coupled to the plurality of antennas, wherein the processor is configured to cause the UE to:
communicate with a base station using a first set of antennas of the plurality of antennas;
determine a throughput/power ratio (TPR) of the first set of antennas, wherein the TPR of the first set of antennas is based on power use associated with the first set of antennas;
determine a TPR of a second set of antennas of the plurality of antennas, wherein the second set of antennas is different than the first set of antennas, wherein the TPR of the second set of antennas is based on power use associated with the second set of antennas;
compare the TPR of the second set of antennas to the TPR of the first set of antennas;
select, based on the comparison, one of the first set of antennas or the second set of antennas; and
exchange data with the base station using the selected set of antennas.

9. The UE of claim 8, wherein the TPR of the first set of antennas is based on a signal to noise ratio (SNR).

10. The UE of claim 8, wherein the TPR of the first set of antennas is based on antenna imbalance and correlation.

11. The UE of claim 8, wherein the processor is further configured to cause the UE to:
determine that the TPR of the first set of antennas is below a threshold; and
activate the second set of antennas in response to the determination that the TPR of the first set of antennas is below the threshold.

12. The UE of claim 11, wherein the processor is further configured to cause the UE to:
perform antenna measurements using the second set of antennas, wherein the TPR of the second set of antennas is determined based on the antenna measurements.

13. The UE of claim 8, wherein the processor is further configured to cause the UE to:
determine that a transmission power using the first set of antennas is above a threshold; and
activate the second set of antennas in response to the determination that the transmission power using the first set of antennas is above the threshold.

14. The UE of claim 8, wherein the TPR of the second set of antennas is based on a lookup table.

15. A method, comprising:
a user equipment device (UE):
communicating with a base station using a first set of antennas of the UE;
determining a throughput/power ratio (TPR) of the first set of antennas, wherein the TPR of the first set of antennas is based on power use associated with the first set of antennas;
determining a TPR of a second set of antennas of the UE, wherein the second set of antennas is different than the first set of antennas, wherein the TPR of the second set of antennas is based on power use associated with the second set of antennas;
selecting, based on the comparison, one of the first set of antennas or the second set of antennas; and
exchanging data with the base station using the selected set of antennas.

16. The method of claim 15, wherein the TPR of the first set of antennas is based on full mutual information.

17. The method of claim 15, wherein the TPR of the first set of antennas is based on antenna imbalance and correlation.

18. The method of claim 15, further comprising:
determining that the TPR of the first set of antennas is below a threshold; and
activating the second set of antennas in response to the determination that the TPR of the first set of antennas is below the threshold.

19. The method of claim 18, further comprising performing antenna measurements using the second set of antennas, wherein the TPR of the second set of antennas is determined based on the antenna measurements.

20. The method of claim 15, further comprising:
determining that a transmission power using the first set of antennas is above a threshold; and
activating the second set of antennas in response to the determination that the transmission power using the first set of antennas is above the threshold.

* * * * *